United States Patent
Bytnar et al.

(10) Patent No.: US 11,365,334 B2
(45) Date of Patent: Jun. 21, 2022

(54) LIQUID DE-ICING BRINE SUSPENSION

(71) Applicant: EnviroTech Services, Inc., Greeley, CO (US)

(72) Inventors: Stephen C. Bytnar, Greeley, CO (US); Stephen Utschig-Samuels, Greeley, CO (US); Derek Bailey, Broomfield, CO (US); Paul Bordoni, Johnstown, CO (US)

(73) Assignee: EnviroTech Services, Inc., Greeley, CO (US)

( * ) Notice: Subject to any disclaimer, the term of this patent is extended or adjusted under 35 U.S.C. 154(b) by 74 days.

(21) Appl. No.: 16/813,252

(22) Filed: Mar. 9, 2020

(65) Prior Publication Data
US 2020/0299558 A1 Sep. 24, 2020

Related U.S. Application Data

(60) Provisional application No. 62/820,584, filed on Mar. 19, 2019.

(51) Int. Cl.
*C09K 3/18* (2006.01)

(52) U.S. Cl.
CPC ................................. *C09K 3/185* (2013.01)

(58) Field of Classification Search
CPC ............. C09K 3/185; C09K 3/18; C09K 3/00
See application file for complete search history.

(56) References Cited

U.S. PATENT DOCUMENTS

| | | | | |
|---|---|---|---|---|
| 9,309,449 B2* | 4/2016 | Koefod | | C09K 3/18 |
| 2010/0025622 A1* | 2/2010 | Blackwell | | C09K 3/185 |
| | | | | 252/70 |

FOREIGN PATENT DOCUMENTS

WO 2017-120423 A1 7/2017

OTHER PUBLICATIONS

Byung Chul Kim, Young Han Kim, Keisuke Fukui, Crystallization monitoring in supersaturated solution with a quartz crystal sensor, Analytica Chimica Acta, V 491, Iss 1, 2003, pp. 71-80, doi: 10.1016/S0003-2670(03)00770-0 (Year: 2003).*

(Continued)

*Primary Examiner* — Kevin E Yoon
*Assistant Examiner* — Marites A Guino-O Uzzle
(74) *Attorney, Agent, or Firm* — Kilpatrick Townsend & Stockton LLP

(57) ABSTRACT

Embodiments of the present invention include de-icing compositions, along with the manufacture of and use of the de-icing compositions. The de-icing compositions achieve a higher melting capacity and melt ice for longer times than conventional de-icing solutions. The de-icing compositions include suspensions of salt instead of solutions. These de-icing suspensions can be applied to ice using liquid application systems. Embodiments include a de-icing composition. The de-icing composition is a suspension. The de-icing composition includes a solvent, which includes water. The de-icing composition may also include a salt component in a total concentration greater than the solubility of the salt component in water at a temperature in a range from 0° F. to 40° F. A portion of the salt component may not be dissolved in the solvent. The undissolved portion of the salt component may include particles with an effective diameter less than 500 μm. The de-icing composition may further include a suspending agent.

28 Claims, 13 Drawing Sheets

(56) References Cited

OTHER PUBLICATIONS

Koefod S, Mackenzie R, Adkins J. Effect of Prewetting Brines on the Ice-Melting Rate of Salt at Very Cold Temperatures. Transportation Research Record. 2015;2482(1):67-73. doi:10.3141/2482-09 (Year: 2015).*
Sarig, S., Eidelman, N., Glasner, A. and Epstein, J.A. (1978), The effect of supersaturation on the crystal characteristics of potassium chloride. J. Chem. Technol. Biotechnol., 28: 663-667. doi: 10.1002/jctb.5700281004 (Year: 1978).*
Types of Saturation, Chem Libretexts (Year: 2020).*
SnowEx Google Index (Year: 2010).*
SnowEx article—Trend of Pre-wettng Salt for Deicing (Year: 2010).*
SnowEx the Helixx Triple Threat Fully Explained (Year: 2010).*

* cited by examiner

LIQUID DE-ICING BRINE SUSPENSION

CROSS-REFERENCE TO RELATED APPLICATION

This application claims the benefit of U.S. Provisional Patent Application No. 62/820,584, entitled "LIQUID DE-ICING BRINE SOLUTION," filed Mar. 19, 2019, which is incorporated herein by reference in its entirety for all purposes.

BACKGROUND

High performance liquid de-icing products conventionally follow one of three options. The first option is try to identify potential materials that suppress the freezing point of water to a greater degree than competing materials on a weight per weight basis. For example, on a weight basis of dissolved solids in the solution, magnesium chloride suppresses the freezing point of water significantly more than sodium chloride. Therefore, magnesium chloride is a superior ice melting material compared to sodium chloride. The second option is to use a material that has a higher degree of solubility, so that more of the active ice melting material is dissolved in water. For example, calcium chloride ($CaCl_2$)) has a higher solubility than sodium chloride. The maximum concentration of sodium chloride at 60° F. in water is 23%. The maximum concentration of calcium chloride at 60° F. in water is 38%. Given a gallon of each of sodium chloride and calcium chloride at the maximum soluble concentration, the same volume of the calcium chloride solution includes more calcium chloride to melt the snow/ice than the same volume of a sodium chloride solution. The third option is to find additives that enhance or complement the melting capacity of the liquid de-icer. These additives generally fall into the category of organic-based materials because they are highly soluble in water and do not negatively affect the solubility of inorganic brines. Examples of additives include sugars and sugar derivatives.

Improved de-icing products have been attempted by combining the first option and second option. For example, sodium chloride brine may be "enhanced" by mixing calcium chloride or magnesium chloride into the sodium chloride brine. However, a limiting factor is still salt solubility. In addition, using a mixture of salt melting products increases the cost of the brine substantially over that of the pure sodium chloride brine.

Improvements to de-icing compositions that are not limited by salt solubility and other improvements in de-icing are desired.

BRIEF SUMMARY

Embodiments of the present invention include de-icing compositions, along with the manufacture of and use of the de-icing compositions. The de-icing compositions achieve a higher melting capacity and melt ice for longer times than conventional de-icing solutions. The de-icing compositions described herein include suspensions of salt in a solution of salt instead of only salt solutions. These de-icing suspensions can be applied to ice using liquid application systems.

Embodiments of the present invention may relate to a de-icer composition including a heterogeneous liquid suspension de-icing salt and additives to act as a suspending agent for the composition and further control the corrosive, rheological, and freeze point depression properties of said composition. Use of such suspending agent additives may allow the heterogeneous liquid suspension to be effectively stabilized and stored at industry standard temperature limitations of 0° F. without sedimentation from the supernate, and use of such corrosion control additives may allow for rheological and freeze point depression modification so that the composition may be transferred and applied with existing industry standard liquid de-icer application equipment.

Embodiments include a de-icing composition. The de-icing composition is a suspension. The de-icing composition includes a solvent, which includes water. The de-icing composition may also include a salt component in a total concentration greater than the solubility of the salt component in water at a temperature from 0° F. to 40° F. A portion of the salt component may be dissolved in the solvent. Another portion of the salt component may not be dissolved in the solvent. This undissolved portion of the salt component may include particles with an effective diameter less than 500 µm. The de-icing composition may further include a suspending agent.

Embodiments may also include a method for de-icing. The method may include applying a de-icing composition that is a suspension to ice.

Embodiments may further include a method of manufacturing a de-icing composition. The method may include adding a solvent that includes water to a salt component and a suspending agent to form a suspension. A portion of the salt component may be dissolved in the solvent. The suspension may include another portion of the salt component that is not dissolved in the solvent. The undissolved portion of the salt component may include particles with a first effective diameter. The method may also include reducing the effective diameter of the particles of the first portion of the salt component from the first effective diameter to a second effective diameter. The method may further include transferring the suspension including the particles having the second effective diameter to a container.

A better understanding of the nature and advantages of embodiments of the present invention may be gained with reference to the following detailed description and the accompanying drawings.

TERMS

Figure 1:
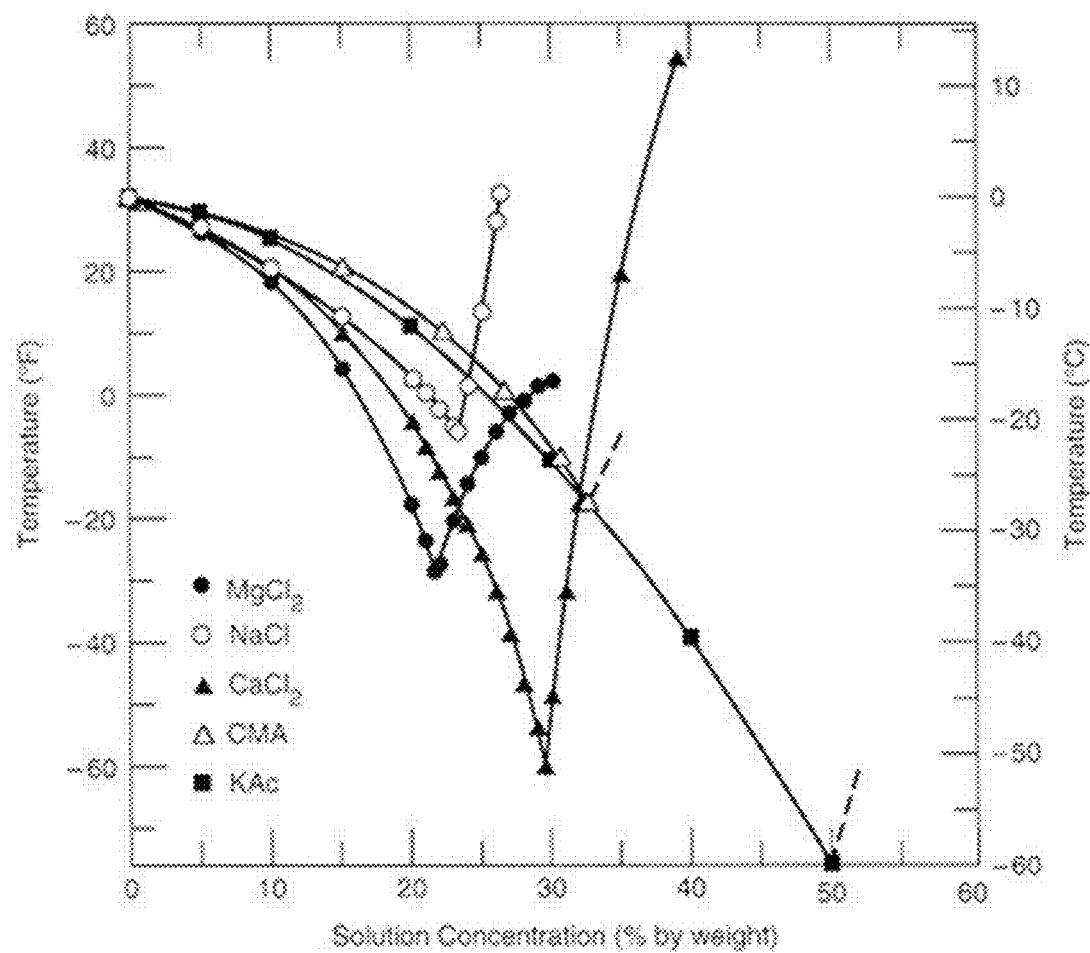
FIG. 1 is a graph showing the relationship between temperature and solution concentration for various salts.

The term "de-icer composition" or "de-icing composition" may be a combination of additives used to melt snow or ice, or prevent snow or ice from bonding to a road surface, parking lot surface, driveway surface, aircraft, watercraft, vehicle, or machine. A de-icer composition can include a suspension solvent, a de-icing salt, a suspending agent, a corrosion inhibitor, a rheology modifier, a freeze point depressant, and a degassing additive, or combinations thereof.

The term "suspension solvent" may refer to a liquid in which a de-icing salt is dissolved into a liquid solution or suspended in excess of the chemical solubility limit as a heterogeneous liquid suspension. The suspension solvent can be a liquid such as water; alcohols including, but not limited, to monohydric alcohols, polyhydric alcohols, unsaturated aliphatic alcohols, alicyclic alcohols; polyols including, but not limited, to low molecular weight polyols including sugar alcohols, polymeric polyols; polar aprotic solvents including, but not limited to, organochlorides, acetates, lactams, cyclic ethers, ketones, amides, organic nitriles, organosulfur compounds, cyclic carbonate esters; or combinations of these suspension solvents.

The term "de-icing salt" may refer to either a liquid de-icing salt or a solid de-icing salt, which can be mixed with a suspension solvent to form solutions or heterogeneous liquid suspensions in excess of the de-icing salt's chemical solubility limit in the suspension solvent. These de-icing salts can be liquid solutions within or at the chemical solubility limits in particular suspension solvents, or micronized solids suspended in a heterogeneous liquid suspension with a diameter of 500 microns or less, preferably 100 microns or less, and most preferably 50 microns or less such as a halide salts including, but not limited to, sodium chloride, magnesium chloride, calcium chloride, potassium chloride, aluminum chloride, lithium chloride, choline chloride; organic salts including, but not limited to, calcium magnesium acetate, sodium acetate, potassium acetate, calcium acetate, sodium formate, potassium formate, calcium formate, carboxylic acids and their salts, polyaminocarboxylic acids and their salts, carbonic acid salts, carbamides and their salts; double salts including, but not limited to, Alums with the general formula $M^{I}M^{III}[SO_4]_2 \cdot 12H_2O$, Tutton's salts with the general formula $[M^{I}]_2M^{II}[SO_4]_2 \cdot 6H_2O$, potassium sodium tartrate, ammonium iron (II) sulfate, bromlite; Deep Eutectic Solvent blends and including, but not limited to, Type I with the general formula $Cat^+X^-\ zMCl_x$ where M=Zinc, Tin, Iron, Aluminum, Gallium, or Indium, Type II with the general formula $Cat^+X^-\ zMCl_x \cdot yH_2O$ where M=Chromium, Cobalt, Copper, Nickel, or Iron, Type III with the general formula $Cat^+X^-zRZ$ where $Z=CONH_2$, COOH, or OH, Type IV with the general formula $MCl_x + RZ = MCl_{x+1}^- + RZ + MCl_{x+1}^-$ where M=Aluminium or Zinc and $Z=CONH_2$; or combinations of these de-icing salts. $Cat^+$ refers to a cation with a 1+ charge. $X^-$ refers to an anion with a 1− charge.

The term "suspending agent" may refer to compounds including hydroxyl groups, carboxylic acid groups and derivatives thereof, sulfate groups, sulfonate groups, phosphate groups, amino groups, amidecarboxyl groups, or combinations thereof where monomer or oligomer units having one or more monosaccharide units and their derivatives thereof combined in glycosidic linkages to form disaccharide or polysaccharides with strong anomeric centers which suspend de-icing salt solids as micronized sediment through electrosteric stabilization in a heterogeneous liquid suspension such as hexoses including, but not limited to, aldohexoses such as D- and L-allose, D- and L-altrose, D- and L-glucose, D- and L-mannose, D- and L-gulose, D- and L-idose, D- and L-galactose, and D- and L-talose, cyclic hemiacetals such as α- and β-D-glucose, and α- and β-D-mannose, and ketohexoses such as D- and L-psicose, D- and L-fructose, D- and L-sorbose, D- and L-tagatose; pentoses including, but not limited to, aldopentoses such as D- and L-arabinose, D- and L-lyxose, D- and L-ribose, and D- and L-xylose, ketopentoses such as D- and L-rubilose, and D- and L-xylulose, and deoxy sugars such as D- and L-deoxyribose; tetroses including, but not limited to, aldotetroses such as D- and L-erythrose, and D- and L-threose, and ketotetroses such as D- and L-erythrulose; and sugar acids including, but not limited to, aldonic acids such as glyceric acid, xylonic acid, gluconic acid, and ascorbic acid, ulosonic acids such as neuraminic acid and ketodeoxyoctulosonic acid, uronic acids such as glucuronic acid, galacturonic acid, and iduronic acid, and aldaric acids such as tartartic acid, meso-galactaric acid, and D-glucaric acid. Examples of which including, but not limited to, xanthan gum, guar gum and derivatives thereof, such as hydroxypropyl guar and carboxymethylhydroxypropyl guar; cellulose and derivatives thereof, such as hydroxyethyl cellulose, carboxymethylcellulose, sodium carboxymethylcellulose, microcrystalline cellulose, fermentation-derived cellulose; tragacanth, γ-, β-, δ-, α-, μ-, κ-, ν-, ι-, λ-, and θ-carrageenans, gum Arabic, agar, locust bean gum, tara gum, gellan gum, fenugreek gum, *cassia* gum, inulin, konjac, diutan gum, welan gum, dextran, pullulan, chitin, chitin acetate, callose, laminarin, chrysolaminarin, xylan, arabinoxylan, mannan, fucoidan, pectin, citrus fiber, hydrolyzed amino acids such as gelatin, synthetic polymers including but not limited to polyacrylate, polymethacrylate, polyacrylamide, polyacrylic acid (Carbomer), polyvinyl alcohol, polyvinyl acetate, polyvinylpyrrolidone, inorganic, water-absorbing clays including but not limited to bentonite, or combinations of these suspending agents.

The term "corrosion inhibitor" may be a compound that is added to or is part of the de-icer composition that reduces the corrosive effect of the de-icing salt on metals, particularly mild steel.

The term "rheology modifier" may be a compound that is added to or is a part of the de-icer composition that either increases or reduces the viscosity of the suspension solvent or the heterogeneous liquid suspension. The selected rheology modifiers may function as reducing agents that donate electrons in a redox chemical reaction. The presence of contaminant trivalent metal cations in de-icing salts may react with select suspending agents to exhibit high viscosity which makes the de-icer composition difficult to use with existing industry standard liquid de-icer application or transfer equipment. Reducing agent rheology modifiers may reduce select trivalent metal cations to a divalent state which do not react with select suspending agents, which lowers viscosity as a result.

The term "freeze point depressant" may be a non-volatile solute that is added to or is a part of the de-icer composition that decreases the freezing point of the suspension solvent.

The term "degassing additives" may refer to compounds that reduce the surface tension of the suspension solvent or heterogeneous liquid suspension so that air entrained in the composition during manufacture can easily escape, thereby preventing the heterogeneous liquid suspension from causing any cavitation in equipment during the transfer or application using industry standard liquid de-icer transfer or application equipment such as surfactant wetting agents, and similar derivatives that may be used to similar effects including, but not limited to, anionic surfactants including, but not limited to, carboxylates, alkyl sulfates, alkyl ether sulfates, sulfated alkanolamines, glyceride sulfates, sulfonates, sulfo-carboxylic compounds, organo-phosphored surfactants, and sarcosides; nonionic surfactants including, but not limited to, ethoxylated linear alcohols, ethoxylated alkyl phenols, fatty acid esters, amine and amide derivatives, alkylpolyglucosides, ethylene oxide/propylene-oxide copolymers, polyalcohols and ethoxylated polyalcohols, and thiols and their derivatives; cationic surfactants including, but not limited to, linear alkyl-amines, alkyl-ammoniums, fatty amines, quaternary alkyl-ammoniums (quats), linear diamines, amides, ester-amines, ether-amines, oxy-amines, ethoxy-amines, alkanol-amides, and amino-acids; amphoteric surfactants including, but not limited to, amino propionic acids, imido propionic acids, quaternized compounds; silicone surfactants including, but not limited to, polydimethylsiloxane (PDMS) and their emulsions; fluorinated surfactants; and polymer surfactants.

A concentration given in percent is understood to be on a w/w basis unless context clearly dictates otherwise.

DETAILED DESCRIPTION

Conventional de-icing products are limited to the solubility of salt in the solvent in order to maintain a de-icing solution. In this manner, conventional de-icing products have a melting performance that is limited by the amount of salt that can dissolve in water. Embodiments of the present invention are not limited by solubility of the salt in water. A de-icing material is intentionally added in an amount well beyond the solubility limits and the material is dispersed in a liquid suspension. In this way, we can significantly increase the amount of ice melting material contained in a gallon of liquid de-icer.

The application of de-icing chemicals can be generally broken into three practices: applying solids, applying liquids, and applying pre-wetted solids. Each have their own advantages and disadvantages. Solid materials are generally more cost effective since they are close to 100% of its mass is the deicing chemical. When they are applied and diluted upon mixing with water as snow and ice are melted, the dilution rate is much slower and allows for better retention of chemical at a higher concentration meaning that the chemical will theoretically last longer in optimal conditions. However, solids require aqueous media in order to go into solution to be effective. This dissolution process takes time, especially in weather conditions with low humidity and freezing temperatures where liquid water is unavailable on road surfaces to facilitate dissolution. As a result, melting times are generally very slow, and often negligible in colder and dryer weather. At temperatures below 15° F., solid sodium chloride deicers are considered ineffective due to the amount of salt/cost per time necessary to achieve de-icing goals. Solids, as they are applied, also tend to bounce and scatter or be displaced by traffic. This removal from road surfaces renders their impact minimal and localized to areas of congregation, thereby limiting their effectiveness even more and providing inconsistent deicing.

Liquid chemicals, on the other hand, begin working almost immediately when applied. Depending upon ice/snowpack thickness, liquids can almost instantaneously penetrate to road surfaces and begin breaking the bonds between the ice/snow and the road surface. The applied liquids can then shallowly embed in road surfaces, allowing them to resist displacement by traffic and therefore remain effective for longer periods of time depending upon conditions. These benefits must be weighed against several disadvantages including higher transportation and storage costs per unit of chemical, the maximum concentration of the particular salts in aqueous media allowed by storage condition temperatures, and the melting capacity (the amount of ice a deicer can melt in a specified period of time) of said particular salts.

The maximum concentration in aqueous media that a particular salt can achieve at the dictated storage condition temperature does not necessarily correlate with the most effective melting capacity in terms of unit chemical, however. It is the practice of the industry to store calcium chloride between 30.0-32.0% by weight, magnesium chloride at 27.0-30.0% by weight, and sodium chloride at 20.3-23.3% by weight in order to provide stable solutions in most typical weather conditions down to 0° F. While higher storage concentrations are theoretically possible, there is a point of diminishing returns where any added concentration is not economically advantageous in terms of the added melting capacity achievable, and there is a risk of sedimentation of solid salt from the supernate as solubility limits are exceeded. This is not practical for the industry since long-term storage is not feasible at concentrations of salts exceeding their respective solubility limits. As such, and due to the chemical solubility limitations of industry-standard de-icing salts, the deliverable melting capacity per unit liquid salt solution is effectively capped. While many additives can synergistically enhance these salt solutions to provide added melting capacity, there is still a limitation on how much salt can be delivered in liquid form.

While liquid de-icers have many advantages over solid de-icers, there is an overall deliverable active concentration that is lacking. For example, solid sodium chloride contains 4.29 times more active de-icing chemical on a mass basis than the industry-standard 23.3% w/w sodium chloride solution. In order to get better use out of both solid and liquid de-icers, the combined use of both in a practice called "pre-wetting" has been established. By applying liquid deicers or other liquid pre-wetting agents to solid salt, bounce and scatter can be reduced since wet solids stick to the road better, and the time needed for the solids to begin dissolving and melting can be greatly reduced. Pre-wetting often includes a small amount of water compared to a large amount of rock salt. For example, 100 to 600 pounds of rock salt may be used with 10 to 20 gallons of liquid pre-wetting agents. Pre-wetting of solids can be done through many methods, some of which require new or modified equipment to be used; in general, the overall result of each still leaves penetration to the road surface and instantaneous effectiveness to be desired—something that currently only liquid deicers can achieve.

Embodiments of the present invention may include a de-icer in liquid form that contains additional salt solids in excess of the chemical solubility limits of the particular salt. Through use of a suspension solvent; suspending agent; combined corrosion inhibitor, rheological modifier, and freeze point depressant; and degassing additive, the deicer may be stable in a heterogeneous liquid suspension form at industry standard temperature limitations of 0° F. without sedimentation from the supernate. The de-icer may be applied as any other liquid de-icer and may achieve the instantaneous effect of penetration to road surfaces typical of liquid de-icers, as well as the sustained retention of chemicals typical of solid de-icers. Surprisingly, it has been found that the addition of suspended salt increased the melting capacity of the liquid solution in a non-linear fashion as a function of overall percent salt in the combined supernate and dispersed phase. Additionally, it was found that use of a reducing agents such as aspartic acid as corrosion inhibitors in the liquid suspension functioned as both rheological modifiers and freeze point depressants, and were used to lower the viscosity and the freezing point of the liquid suspension to allow for greater functionality in transferring and applying the liquid suspension product, and for enhanced storage stability at industry standard temperature limitations of 0° F. and other temperatures.

Additionally, conventional liquid de-icing products may be stored at a single location, which may require significant volumes of storage equipment. In addition, in times of high demand, the de-icing product may be depleted from storage, requiring the storage volume to be refilled with the de-icing product often during a snowstorm. Embodiments of the present invention may include methods of producing de-icing products on demand rather than storing large quantities of the de-icing product.

Conventional products also include dry salt compositions. While these products are not limited by solubility, dry products are harder to apply to melt ice. With greater surface contact, a liquid product melts ice faster than a dry product. Liquid products are also more efficient in material used in the product. Embodiments of the present invention have melting performance close to the performance of a dry product but with the ease of applicability of a liquid product.

I. Compositions

Embodiments of the present invention include de-icing compositions. The de-icing composition is a suspension. The de-icing composition includes a solvent. The solvent may include water. The solvent may be in a range from 40% to 50%, 50% to 60%, 60% to 70%, or 70% to 80% of the composition. The liquid portion of the de-icing composition may be in a range from 40% to 50%, 50% to 60%, 60% to 70%, or 70% to 80% of the composition. The solid portion of the de-icing composition may be 100% minus the liquid portion of the de-icing composition.

The de-icing composition also includes a salt component. The salt component may be at least one of sodium chloride, sodium formate, sodium succinate, sodium acetate, calcium chloride, potassium chloride, potassium acetate, potassium formate, potassium succinate, magnesium chloride, calcium magnesium acetate, sodium citrate, disodium citrate, potassium citrate, potassium magnesium citrate, a salt of EDTA, potassium carbonate, and sodium carbonate. The cation of the salt may include sodium, magnesium, or potassium. The anion of the salt may include chloride, acetate, citrate, or carbonate.

The salt component is in a total concentration greater than the solubility of the salt component in water. The total concentration at 60° F. may be in a range from 35% to 55% w/w, including from 35% to 40%, from 40% to 45%, from 45% to 50%, or from 50% to 55%.

A first portion of the salt component may not be dissolved in the solvent. The first portion of the salt component may include solid particles with an effective diameter less than 100 µm. The particles may not be perfectly spherical. The effective diameter is the diameter of the particle for a sphere having the same volume as the particle. In embodiments, the solid particles may have an effective diameter less than 50 µm, 40 µm, 30 µm, 20 µm, 10 µm, or any value in a range between any two effective diameters. The effective diameter may be the maximum, median, mean, or mode of the effective diameters for the solid particles. The composition may exclude any solid particles of salts other than those in the first portion.

A second portion of the salt component is dissolved in the solvent. The second portion of the salt component may be in a concentration equal to the solubility of the salt component in the solvent. For example, the solubility of the salt component may be from 20% to 25% w/w, 25% to 30% w/w, 30% to 35% w/w, or 35% to 40% w/w, including 23% w/w, 30% w/w, 32% w/w, or 40% w/w. The solubility of a sodium chloride brine may be 23% w/w. The solubility of magnesium chloride brine may be 30% w/w. The solubility of calcium chloride brine may be 32% w/w. The solubility of sodium formate brine may be 40% w/w.

The salt component may include a first salt and a second salt. A first portion of the salt component may include the first salt. A second portion of the salt component is dissolved in the solvent. The second portion of the salt component may be in a concentration equal to the solubility of the salt component in the solvent. The second portion of the salt component may include the second salt. A plurality of salts may be dissolved or undissolved in the composition.

The de-icing composition may further include a suspending agent. The suspending agent may be in a concentration in a range from 0.01% to 5%. The suspending agent may include at least one of an alginate, methylcellulose, hydroxyethylcellulose, carboxymethylcellulose, sodium carboxymethylcellulose, microcrystalline cellulose, acacia, tragacanth, xanthan gum, bentonite, carbomer, carrageenan, powdered cellulose, gelatin, gum Arabic, agar, guar gum, locust bean gum, tara gum, gellan gum, inulin, konjac, and pectin.

In addition, the de-icing composition may include a dispersant. The dispersant may be anionic or amphoteric. The de-icing composition may further include a defoamer.

The de-icer composition can include a combination of additives such as a suspending agent such as xanthan gum and a combined corrosion inhibiting, rheological modifying, a freeze point depressing additive such as aspartic acid. The composition may also include a liquid de-icing salt in a suspension solvent solution of de-icing salt such as sodium chloride in water. The composition may further include a micronized solid de-icing salt suspended in the liquid supernate phase in excess of the chemical solubility limits of the liquid de-icing salt, such as solid sodium chloride. Other performance enhancers can be added to the de-icer composition, such as degassing additives.

Embodiments may include in the heterogeneous liquid suspension de-icer composition where the suspension solvent is water, alcohols, polyols, polar aprotic solvents or combinations thereof. The de-icing salt may be included up to the chemical solubility limit in the particular suspension solvent and may be a halide salt, organic salt, double salt, Deep Eutectic Solvent blend or combinations thereof. The composition may include a suspending agent, where the suspending agent may be xanthan gum, guar gum and derivatives thereof, such as hydroxypropyl guar and carboxymethylhydroxypropyl guar; cellulose and derivatives thereof, such as hydroxyethyl cellulose, carboxymethylcellulose, sodium carboxymethylcellulose, microcrystalline cellulose, fermentation-derived cellulose; tragacanth, γ-, β-, δ-, α-, μ-, κ-, ν-, ι-, λ-, and θ-carrageenans, gum Arabic, agar, locust bean gum, tara gum, gellan gum, fenugreek gum, *cassia* gum, inulin, konjac, diutan gum, welan gum, dextran, pullulan, chitin, chitin acetate, callose, laminarin, chrysolaminarin, xylan, arabinoxylan, mannan, fucoidan, pectin, and citrus fiber or combinations thereof.

The combined corrosion inhibiting, rheology modifying, freeze point depressing additive may be a reducing agent and may include carboxylic acids and their respective salts such as aspartic acid and other amino acids, straight chain carboxylic acids, unsaturated monocarboxylic acids, keto acids, aromatic carboxylic acids, dicarboxylic acids, tricarboxylic acids, alpha hydroxy acids, divinylether fatty acids and their respective salts, sulfites, benzenediols, polyaminocarboxylic acids and their salts, organophosphorous compounds and their salts, or combinations thereof. The solid de-icing salt suspended in the liquid supernate phase in excess of the chemical solubility limits of the de-icing salt in the suspension solvent, may be micronized to a sediment diameter of 1000 microns or less, preferably 500 microns or less, more preferably 100 microns or less, and most preferably 50 microns or less, and may be a halide salt, organic salt, double salt, Deep Eutectic Solvent blend, any salt descried herein, or combinations thereof. The de-icer composition may include a degassing additive surfactant wetting agent, which may be anionic, nonionic, cationic, amphoteric, siloxane, fluorinated, or polymeric.

The de-icer composition may contain a combined corrosion inhibitor, rheology modifier, and freeze point depressant in the form of a reducing agent such as carboxylic acids and their respective salts such as straight chain saturated carboxylic acids including, but not limited to, carbonic acid, formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, and arachidic acid and their isomers. The reducing agent may include unsaturated monocarboxylic acids including, but not limited to, acrylic acid and their isomers; amino acids including, but not limited to, as alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, selenocysteine, and pyrrolysine. The reducing agent may include keto acids including, but not limited to, alpha-keto acids such as pyruvic acid, oxaloacetic acid, and alpha-ketoglutarate, beta-keto acids including, but not limited to, as acetoacetic acid, gamma-keto acids including, but not limited to, as levulinic acid.

The reducing agent may also include aromatic carboxylic acids including, but not limited to, as benzoic acid, salicylic acid, and phenyl alkanoic acids. The reducing agent may further include dicarboxylic acids including, but not limited to, as oxalic acid, malonic acid, succinic acid, glutaric acid, adipic acid, pimelic acid, suberic acid, azelaic acid, sebacic acid, undecanedioic acid, dodecanedioic acid, brassylic acid, thapsic acid, japanic acid, phellogenic acid, and equisetolic acid. In addition, the reducing agent may include tricarboxylic acids including, but not limited to, as citric acid, isocitric acid, aconitic acid, propane-1,2,3-tricarboxylic acid, and trimesic acid. Further reducing agents may include alpha hydroxy acids including, but not limited to, as lactic acid, glycolic acid, and mandelic acid. Additional reducing agents may include divinvylether fatty acids including, but not limited to, as colneleic acid, and colnelenic acid. The reducing agent may include sulfites including, but not limited to, sodium sulfite, sodium bisulfite, sodium metabisulfite, potassium sulfite, potassium bisulfite, potassium metabisulfite, potassium hydrogen sulfite, calcium sulfite and calcium hydrogen sulfite. The reducing agent may include benzenediols including, but not limited to, catechol, resorcinol, hydroquinone.

The reducing agent may include chelating agents including, but not limited to, polyaminocarboxylic acids and their alkali metal, alkaline earth metal and transition metal salts including, but not limited to, diammonium ethylenediaminetetraacetate (($NH_4$)$_2$EDTA), tetraammonium ethylenediaminetetraacetate (($NH_4$)$_4$EDTA), tetrasodium ethylenediaminetetraacetate tetrahydrate (NaEDTA.4$H_2$O), disodium ethylenediaminetetraacetate dehydrate ($Na_2H_2$EDTA.2$H_2$O), ethylene diaminetetraacetic acid ($H_4$EDTA), disodium ethylenediaminetetraacetate dehydrate ($Na_2H_2$EDTA.2$H_2$O), calcium disodium ethylenediaminetetraacetate dehydrate (CaNa$_2H_2$EDTA.2$H_2$O), trisodium N-(hydroxyethyl)-ethylenediaminetriacetate (HEDTA), pentasodium diethylenetriaminepentaacetate ($Na_5$DPTA, DPTA), pentapotassium diethylenetriaminepentaacetate ($K_5$DPTA, DPTA), diethylenetriaminepentaacetic acid ($H_5$DPTA, DPTA), nitriloacetic acid, trisodium salt (NTA), glutamic acid, N,N-diacetic acid, tetrasodium (GLDA $Na_4$), glutamic acid, N,N-diacetic acid, monosodium (GLDA Na), ethanoldiglycinic acid (EDG $Na_2$, HEIDA) and glucoheptanoic acid; organophosphorus compounds including, but not limited, to 1-hydroxyl ethylidene-1,1,-diphosphonic acid (HEDP), amino tri (methylene phosphonic acid) (AMTP), diethylenetriamine penta(methylene phosphonic acid), bis(hexamethylene triamine penta(methylenephosphonic acid)), ethylidenediamine tris(methylene phosphonic acid), pentapotassium salt $Na_5$EDTMP, and hexamethylenediamine tetra(methylene phosphonic acid), potassium salt, and combinations of these reducing agents.

FIG. 1 shows the temperature required for a given solubility of a salt. FIG. 1 was obtained from the U.S. Department of Transportation Federal Highway Administration *Manual of Practice for An Effective Anti-Icing Program* (June 1996) at www.fhwa.dot.gov/publications/research/safety/95202/005.cfm. The y-axis shows the temperature in degrees Fahrenheit or degrees Celsius. The x-axis shows the concentration of the salt. FIG. 1 shows magnesium chloride ($MgCl_2$), sodium chloride (NaCl), calcium chloride ($CaCl_2$)), calcium magnesium acetate (CMA), and potassium acetate (KAc). The graph shows the temperature associated with a given maximum solubility. For example, for calcium chloride, at around-60° F., the maximum solubility is around 30 wt. %. To achieve a higher concentration of calcium chloride than 30 wt. %, then the temperature must be raised above −60° F. The use of a suspension with solid salt along with a salt solution at its maximum solubility allows for a de-icing composition to effectively have a higher concentration of salt at a temperature than without a suspension. For example, a suspension of calcium chloride may allow for a concentration of calcium chloride above 30% at −60° F.

A. Methods of Using the Composition

The composition may be applied to ice. The ice may be on a road, parking lot, driveway, an aircraft, a watercraft, a vehicle, or a machine. The de-icing composition may be applied with a liquid application system. The de-icing composition may be sprayed or dripped onto ice. The liquid application system may be on a vehicle, including a truck, which includes a de-icing truck. The method may further include melting the ice.

B. Example Compositions

Examples of compositions may include, but are not limited to, the following.

Example 1: 0.25% xanthan gum, 0.1% defoamer, 10% suspended NaCl (w/w in 23% salt brine).

Example 2: 0.3% xanthan gum, 0.5% defoamer, 8% suspended sodium formate (w/w in 23% salt brine).

Example 3: 0.5% xanthan gum, 0.25% defoamer, 12% suspended potassium acetate (w/w in 23% salt brine).

Example 4: 0.25% xanthan gum, 0.1% defoamer, 20% suspended sodium chloride (w/w in 30% magnesium chloride brine).

Example 5: 0.15% xanthan gum, 0.5% defoamer, 5% suspended sodium chloride (w/w in 32% calcium chloride brine).

Example 6: 0.4% xanthan gum, 0.1% defoamer, 10% suspended sodium formate (w/w in 40% sodium formate brine).

Gum concentrations may vary to extend or reduce lifetime of the suspension as desired. Higher concentrations of gum may extend the lifetime.

Example 7: The de-icer composition may include a suspension solvent; a de-icing salt; a suspending agent; a combined corrosion inhibitor, a rheology modifier, and a freeze point depressant; and a degassing additive. The suspension solvent may be water in a concentration of 47.00-66.70%, 58.60-66.45%, or 66.15%.

The de-icing salt may be sodium chloride in the form of a liquid de-icing agent in a concentration up to the chemical solubility limit of 23.30% at 0° F. The de-icing salt may also include sodium chloride in the form of a solid de-icing agent micronized to a sediment diameter of 500 to 100 microns, 100 to 50 microns, or 50 microns or less. The de-icing salt may be in a concentration of 9.70-26.70%, 9.70-16.70%, or 9.70% for a total de-icing salt concentration of 33.00-50.00%, 33.00-40.00%, or 33.00%.

The suspending agent may be xanthan gum in a concentration of 0.10-1.00%, 0.20-0.40%, or 0.25%.

The combined corrosion inhibitor, rheology modifier, and freeze point depressant may be aspartic acid at a concentration of 0.10-1.00%, 0.25-0.75%, or 0.50%.

The degassing additive may be polydimethylsiloxane emulsion at a concentration of 0.10-1.00%, 0.10-0.25%, or 0.10%.

C. Melting Performance

De-icing compositions that are suspensions of salt have better melting performance than conventional de-icing compositions that are solutions. The suspensions have longer lasting melting ability than solutions, allowing the suspensions to melt more grams of ice per volume of de-icing composition.

Figure 2:
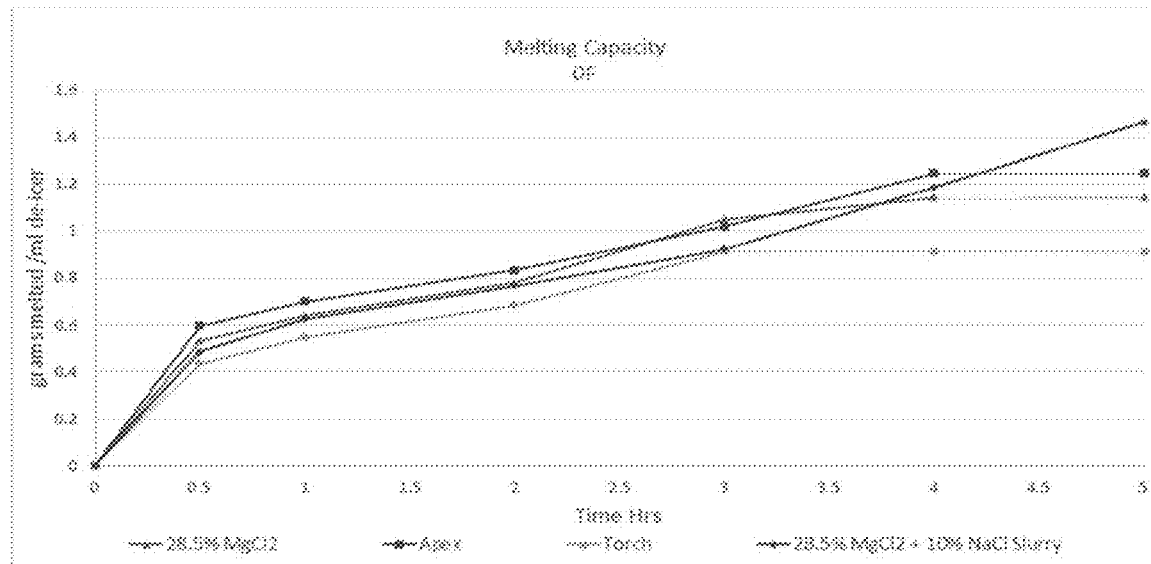
FIG. 2 is a graph of the melting capacity of magnesium-based products at 0° F. according to embodiments of the present invention.

FIG. 2 shows the melting capacity of magnesium-based products at 0° F. The solid lines show the melting performance. The dotted line indicates that melting has stopped, and the liquid starts to refreeze. The dotted line therefore shows the maximum melting capacity of the de-icing composition.

The solubility level of magnesium chloride in water is approximately 33.5% at 60° F. A solution of 28.5% magnesium chloride was tested. This 28.5% solution of magnesium chloride melts ice until about 4 hours and melts under 1.2 grams of ice per milliliter of de-icing composition. Melt-Down Apex™ composition, which includes an enhanced magnesium chloride brine, melts ice until about 4 hours and melts over 1.2 g/ml of de-icing composition. The concentration of magnesium chloride in MeltDown Apex' is typically 29% but can range from 28% to 30%. NexGen Torch™ composition, another magnesium-based product, melts ice for 3 hours and melts about 0.9 g/ml of de-icing composition. A suspension of 28.5% $MgCl_2$ and 10% NaCl melts for 5 hours and melts over 1.4 g/ml of de-icing composition. The suspension performed the best by melting ice for the longest time and melting the most amount of ice per milliliter of de-icing composition.

Figure 3:
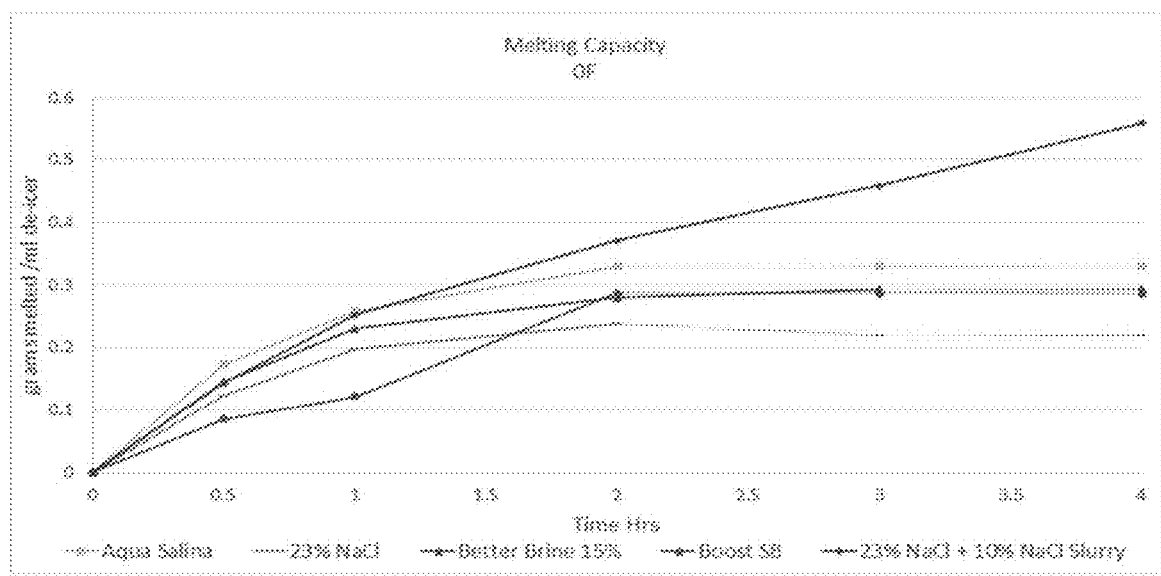
FIG. 3 is a graph of the melting capacity of sodium-based products at 0° F. according to embodiments of the present invention.

FIG. 3 shows the melting capacity of sodium-based products at 0° F. The solubility level of sodium chloride in water is approximately 23%. AquaSalina+®, 23% NaCl, and Boost™ SB compositions melt ice for 2 hours. AquaSalina+® composition contains 7-11% sodium chloride, 8%-10% calcium chloride, 2%-2.5% magnesium chloride, and 0.5-1.5% potassium chloride. Boost™ SB composition includes an organic salt brine additive. BetterBrine™ 15% composition includes 15% sodium chloride, and 0.5-2% magnesium chloride, and 0.4-1.2% calcium chloride. BetterBrine™ 15% composition melts ice for 3 hours. The 23% NaCl solution melts ice at over 0.2 g/ml of de-icing composition. Boost™ SB and BetterBrine™ 15% melt ice at about 0.3 g/ml of de-icing composition. AquaSalina+® melts ice at over 0.3 g/ml of de-icing composition. A suspension of 23% NaCl brine and 10% NaCl solids bests the above solutions by melting ice at close to 0.4 g/ml of de-icing composition, which was reached in 2 hours. This performance was higher than the solutions at any melting time. However, the NaCl suspension continued to melt ice up to 4 hours. At 4 hours, the suspension melted about 0.55 g/ml of de-icing composition. Thus, the suspension outperformed solutions in both melting time and maximum melting capacity.

Figure 4:
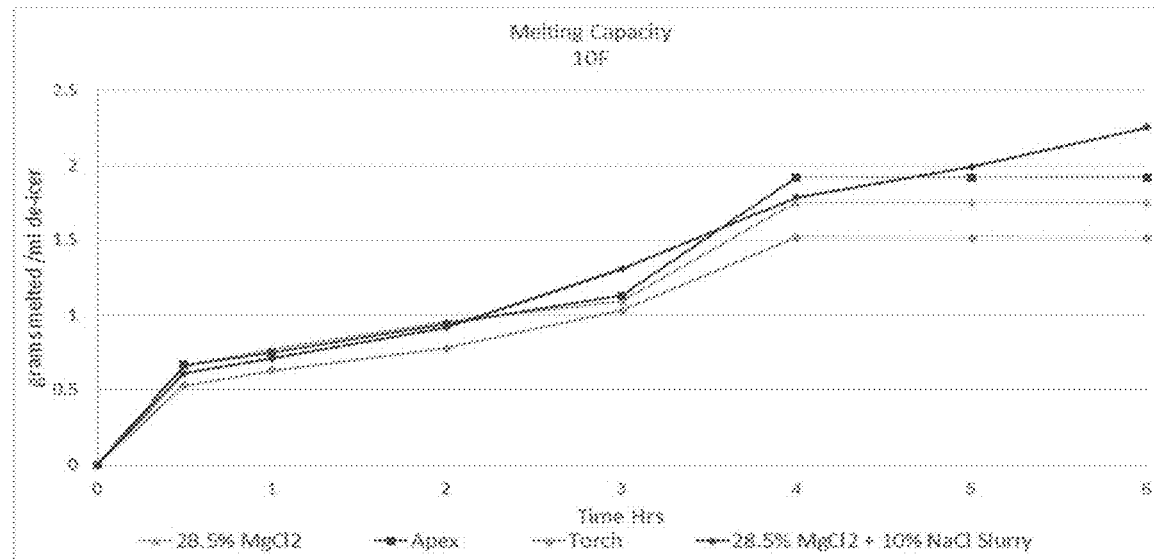
FIG. 4 is a graph of the melting capacity of magnesium-based products at 10° F. according to embodiments of the present invention.

FIG. 4 shows the melting capacity of magnesium-based products at 10° F. As with the results at 0° F., the 28.5% $MgCl_2$ and 10% NaCl suspension has a higher melting capacity and melts ice for longer than magnesium-based solutions. The 28.5% $MgCl_2$ solution, Meltdown Apex™, and Torch™ compositions all reached their maximum melting capacity at 4 hours. Of these three solutions, Meltdown Apex™ has the highest melting capacity at almost 2 g/ml of de-icing composition. The 28.5% $MgCl_2$ solution has a melting capacity of about 1.8 g/ml, and Torch™ has a melting capacity of about 1.5 g/ml of de-icing composition. The 28.5% $MgCl_2$ and 10% NaCl suspension melted ice for 6 hours, reaching a melting capacity of about 2.3 g/ml of de-icing composition.

Figure 5:
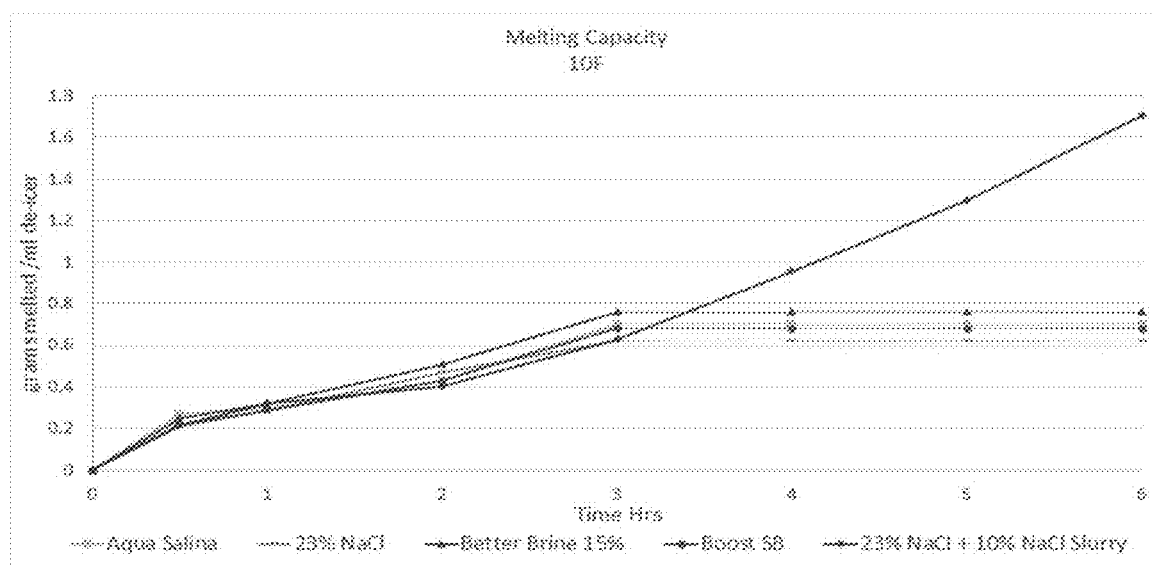
FIG. 5 is a graph of the melting capacity of sodium-based products at 10° F. according to embodiments of the present invention.

FIG. 5 shows the melting capacity of sodium-based products at 10° F. As with the results at 0° F., the suspension of 23% NaCl and 10% NaCl slurry outperformed the sodium-based solutions. AquaSalina+®, 23% NaCl, Better-Brine™ 15%, and Boost™ SB all reached their maximum melting capacity at 3 hours. The maximum melting capacity ranged from 0.6 to 0.8 g/ml of de-icing composition. The suspension of 23% NaCl and 10% NaCl slurry reached a melting capacity of 0.6 g/ml of de-icing composition at 3 hours, but then increased melting capacity to about 1.7 g/ml at 6 hours.

At both 0° F. and 10° F. and with both magnesium-based products and sodium-based products, the suspensions melted a larger amount of ice and melted ice for a longer duration than solutions. With the sodium-based suspensions, about 43% more sodium chloride was added in a slurry to sodium chloride dissolved in solution, but the melting capacity increased by much greater than 43%.

D. Example Composition Melting Results

Table 1 shows different de-icer compositions. The first column lists the percentage of sodium chloride overall in the composition. The second column lists the concentration of xanthan gum, which may be a suspending agent. The third column lists the concentration of polydimethylsioxane emulsion, which may be a degassing additive. The fourth column lists the concentration of aspartic acid, which may be a combined corrosion inhibitor, rheological modifier, and freeze point depressant. The fifth column lists the concentration of water as balance, which can be determined by summing the other concentrations and subtracting from 100%.

TABLE 1

| % NaCl | % Xanthan Gum | % PDMS Emulsion | % Aspartic Acid | % Water |
|---|---|---|---|---|
| 5.00 | 0.00 | 0.00 | 0.00 | Balance |
| 10.00 | 0.00 | 0.00 | 0.00 | Balance |
| 15.00 | 0.00 | 0.00 | 0.00 | Balance |
| 17.00 | 0.00 | 0.00 | 0.00 | Balance |
| 19.00 | 0.00 | 0.00 | 0.00 | Balance |
| 21.00 | 0.00 | 0.00 | 0.00 | Balance |
| 23.00 | 0.00 | 0.00 | 0.00 | Balance |
| 24.00 | 0.00 | 0.00 | 0.00 | Balance |
| 26.00 | 0.00 | 0.00 | 0.00 | Balance |
| 28.00 | 0.00 | 0.00 | 0.00 | Balance |
| 30.00 | 0.00 | 0.00 | 0.00 | Balance |
| 33.00 | 0.00 | 0.00 | 0.00 | Balance |
| 24.00 | 0.25 | 0.10 | 0.00 | Balance |
| 26.00 | 0.25 | 0.10 | 0.00 | Balance |
| 28.00 | 0.25 | 0.10 | 0.00 | Balance |
| 30.00 | 0.25 | 0.10 | 0.00 | Balance |
| 33.00 | 0.25 | 0.10 | 0.00 | Balance |
| 24.00 | 0.25 | 0.10 | 0.50 | Balance |
| 26.00 | 0.25 | 0.10 | 0.50 | Balance |
| 28.00 | 0.25 | 0.10 | 0.50 | Balance |
| 30.00 | 0.25 | 0.10 | 0.50 | Balance |
| 33.00 | 0.25 | 0.10 | 0.50 | Balance |

Table 2 shows the melting capacity results for different compositions from Table 1. The first column shows the composition, including the total sodium chloride concentration. The second column shows the melting capacity in grams per ml. The third column shows the rate of melting per percent of sodium chloride for the composition with the highest melting capacity in two groups of compositions; the first group of compositions has the salt as only a liquid de-icing agent, and the second group of compositions has the salt as a suspension. The top section of the third column shows the efficiency of the first 23% of NaCl. The bottom section of the third column shows how the efficiency increases dramatically with the next 10% of solids added past the solubility point. Table 2 shows that the rate per percent of sodium chloride is higher for the suspensions than the solutions.

TABLE 2

| Composition | Melting Capacity (g/ml) | Rate (per % NaCl) |
|---|---|---|
| 5% NaCl | 0.0098 | (0.6251 g/ml)/ |
| 10% NaCl | 0.0195 | (23% NaCl) = |
| 15% NaCl | 0.1437 | 0.0272 g/ml |
| 17% NaCl | 0.1134 | ice per % NaCl |
| 19% NaCl | 0.1663 | |
| 21% NaCl | 0.3472 | |
| 23% NaCl | 0.6251 | |
| 24% NaCl + 0.25% XG + 0.1% PDMS + 0.5% AA | 0.6317 | (1.2347-0.6251 g/ml)/ (33-23% NaCl) = 0.0610 g/ml ice per % NaCl |
| 26% NaCl + 0.25% XG + 0.1% PDMS + 0.5% AA | 0.7435 | |
| 28% NaCl + 0.25% XG + 0.1% PDMS + 0.5% AA | 0.8513 | |
| 30% NaCl + 0.25% XG + 0.1% PDMS + 0.5% AA | 1.0821 | |
| 33% NaCl + 0.25% XG + 0.1% PDMS + 0.5% AA | 1.2347 | |

Figure 6:
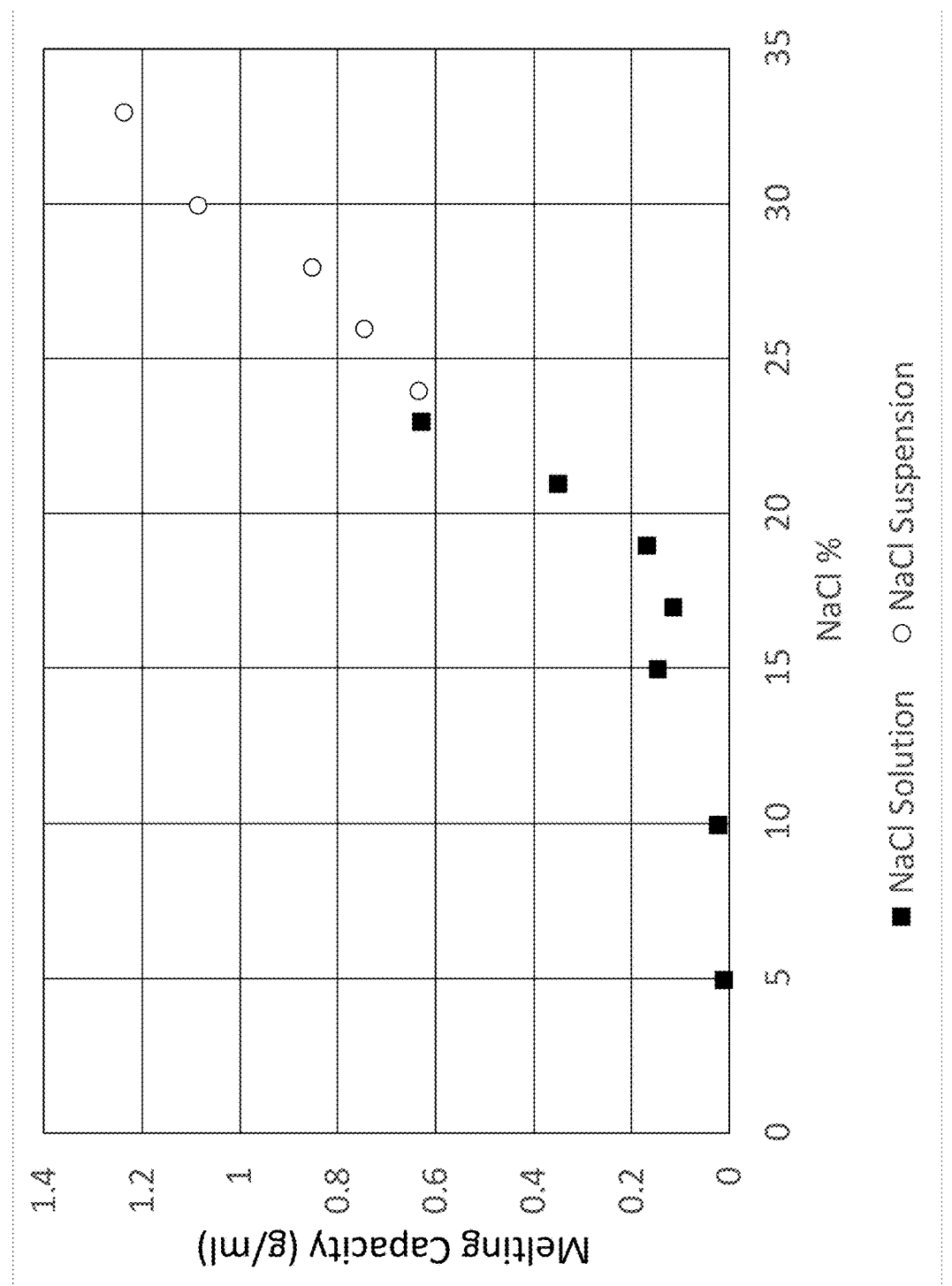
FIG. 6 shows a plot of melting capacity at 10° F. versus sodium chloride concentration according to embodiments of the present invention.
Figure 7:
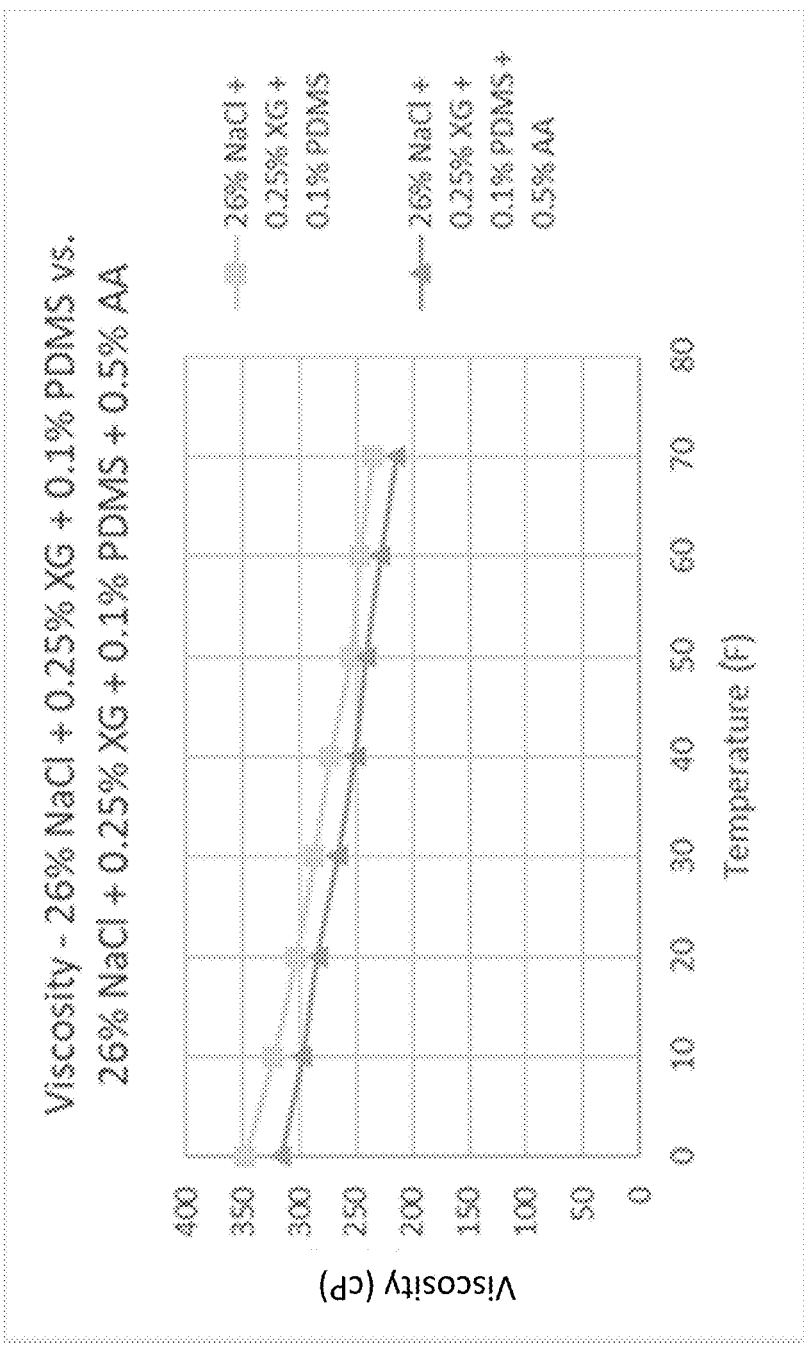
FIG. 7 show a plot of viscosity at different temperatures for a composition with and without aspartic acid according to embodiments of the present invention.
Figure 8:
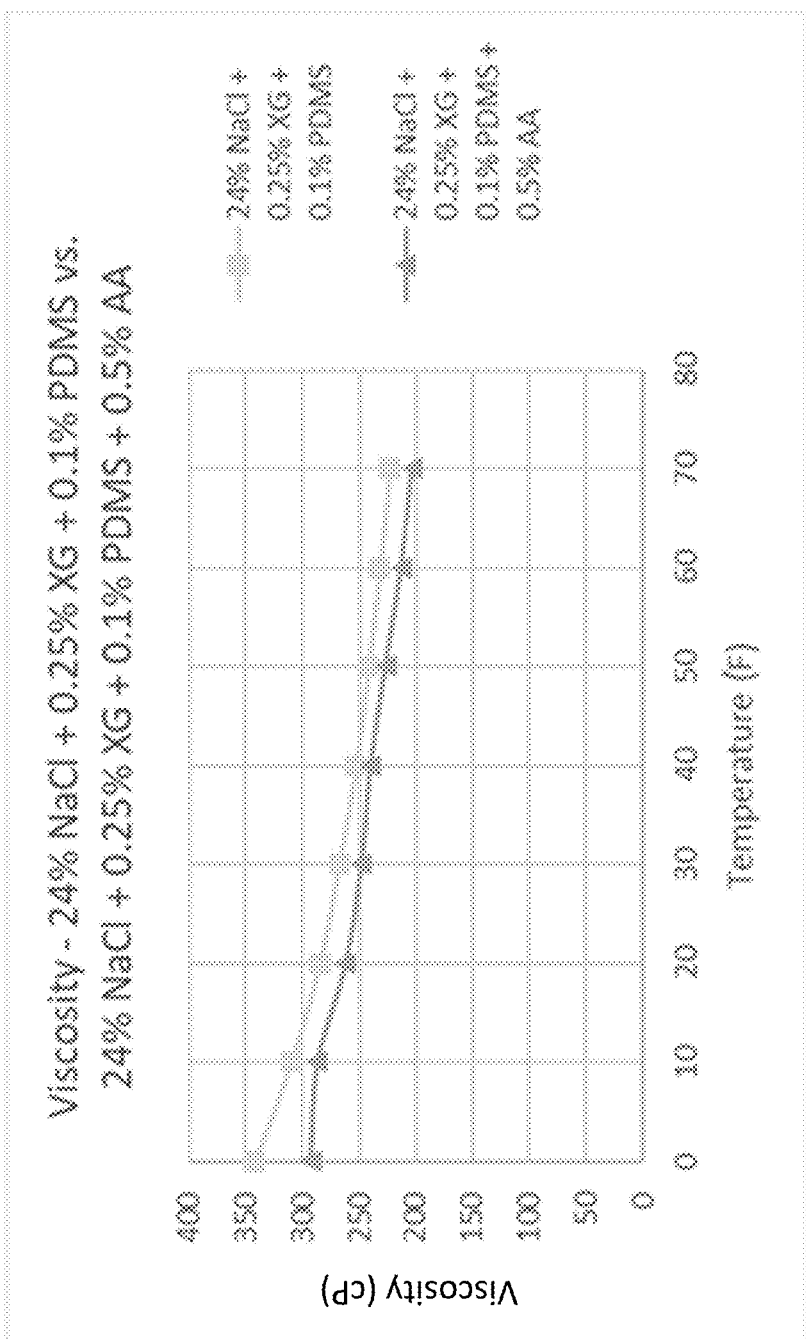
FIG. 8 show a plot of viscosity at different temperatures for a composition with and without aspartic acid according to embodiments of the present invention.
Figure 9:
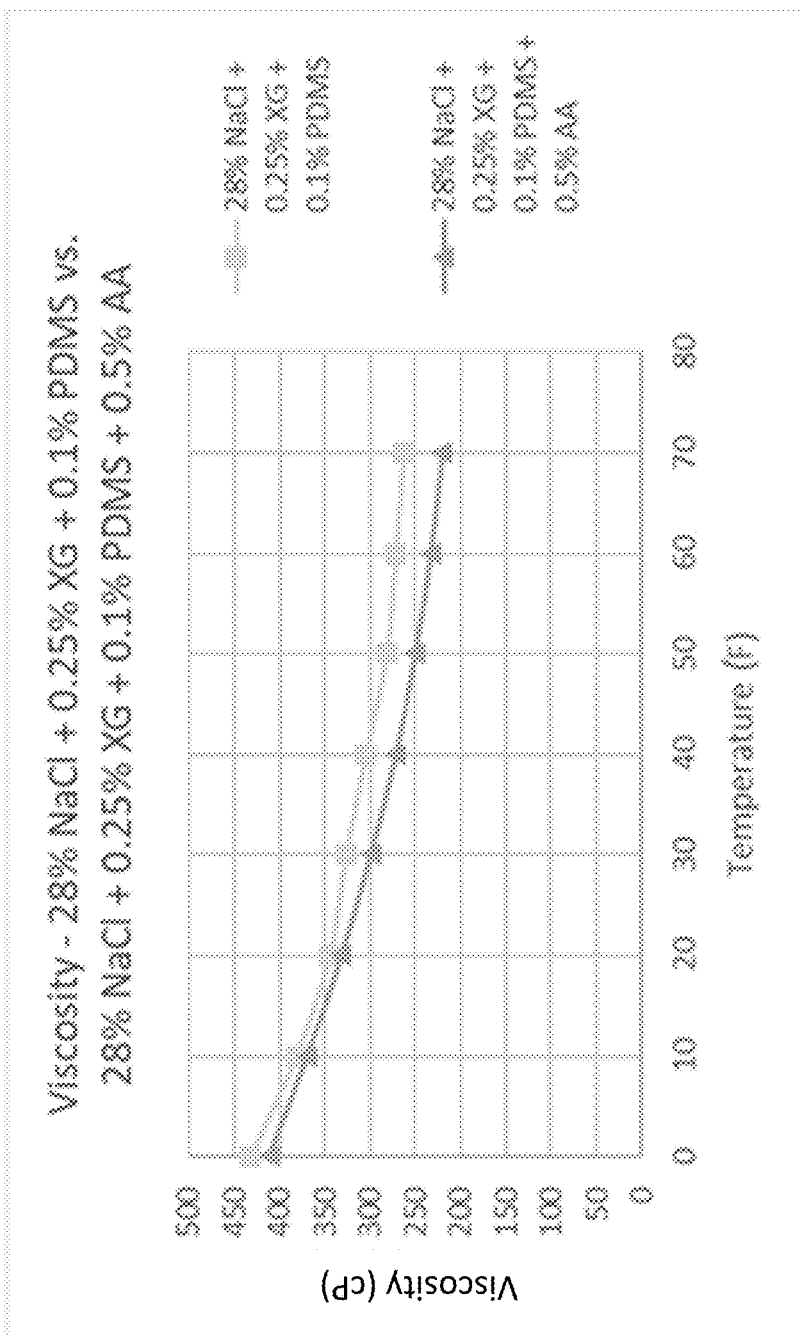
FIG. 9 show a plot of viscosity at different temperatures for a composition with and without aspartic acid according to embodiments of the present invention.
Figure 10:
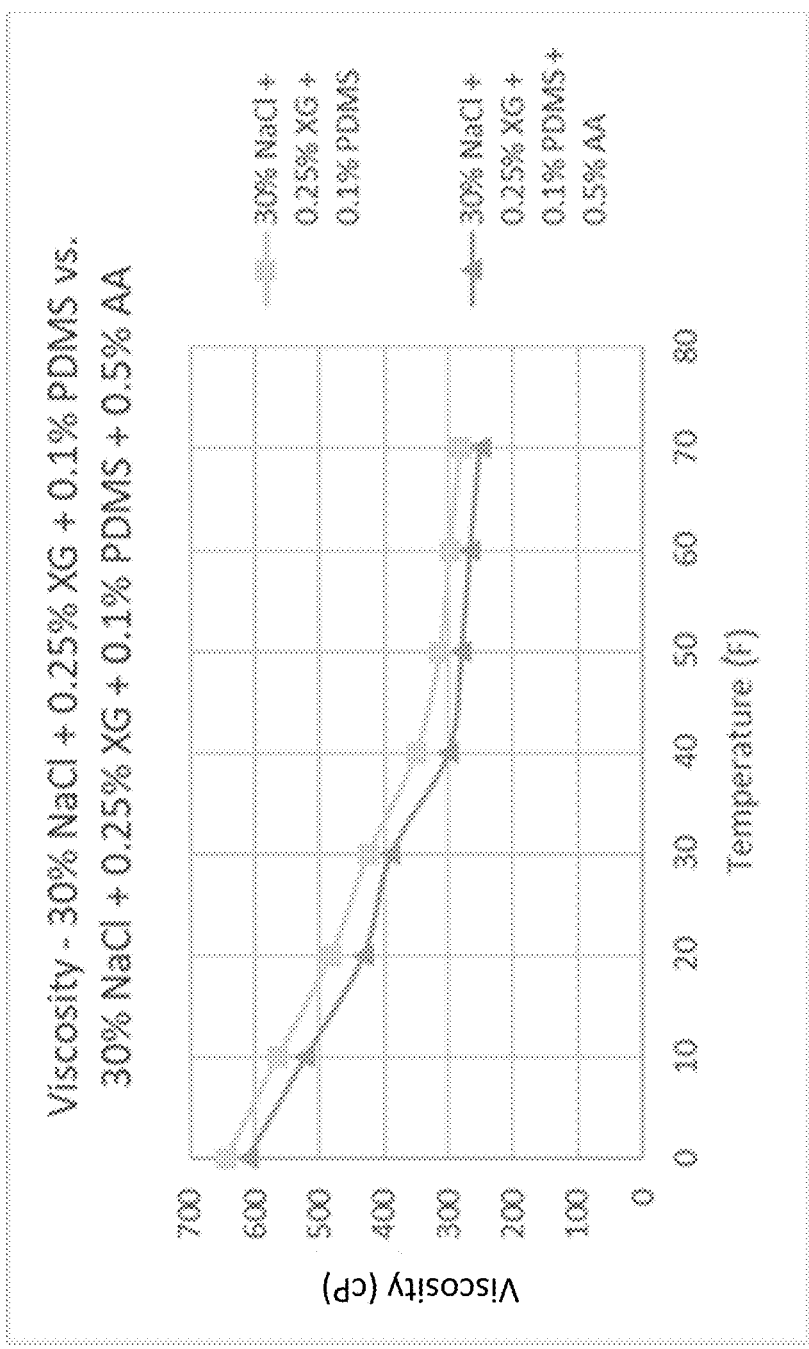
FIG. 10 show a plot of viscosity at different temperatures for a composition with and without aspartic acid according to embodiments of the present invention.
Figure 11:
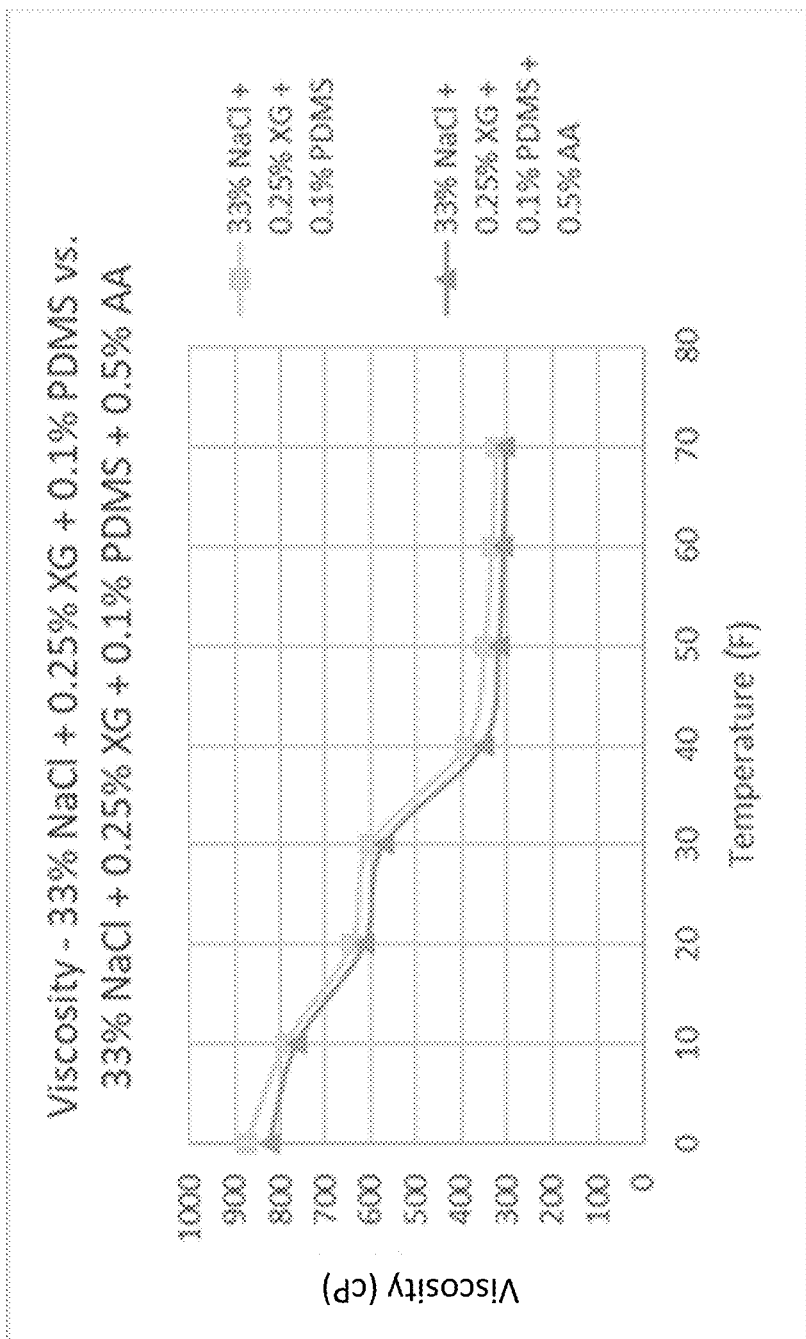
FIG. 11 show a plot of viscosity at different temperatures for a composition with and without aspartic acid according to embodiments of the present invention.

FIG. 6 shows a plot of melting capacity at 10° F. versus sodium chloride concentration for the data provided in Table 2. The y-axis shows the melting capacity in grams per milliliter. The x-axis shows the sodium chloride concentration. FIG. A6 shows that a higher melting capacity can be achieved with higher concentrations of sodium chloride, including those in a suspension.

Table 3 shows a comparison of melting capacity at various temperatures of de-icing composition suspensions against industry standards. The first column shows the different compositions. The industry standards include 23.3% sodium chloride liquid or solid sodium chloride. The liquid suspension includes the 33% sodium chloride composition shown in Table 1. The second column shows the temperature in degrees Fahrenheit for which melting capacity is tested. The third column shows the melting capacity at the temperature. The fourth column shows the percent increase in melting capacity for a liquid suspension with 33% sodium chloride against a 23.3% sodium chloride liquid. Table 3 shows a large increase in melting capacity for a 33% sodium chloride suspension compared to either a 23.3% sodium chloride liquid or a solid sodium chloride.

TABLE 3

| Composition | Temperature (° F.) | Melting Capacity (g/ml) | Percent Increase |
|---|---|---|---|
| 23.3% Sodium Chloride Liquid | 0.00 | 0.2195 | 154.62% |
| 33% NaCl + 0.25% XG + 0.1% PDMS + 0.5% AA | 0.00 | 0.5589 | |
| 23.3% Sodium Chloride Liquid | 10.00 | 0.1134 | 206.17% |
| 33% NaCl + 0.25% XG + 0.1% PDMS + 0.5% AA | 10.00 | 0.3472 | |
| Solid Sodium Chloride | 10.00 | 0.1663 | 108.78% |

TABLE 3-continued

| Composition | Temperature (° F.) | Melting Capacity (g/ml) | Percent Increase |
|---|---|---|---|
| 33% NaCl + 0.25% XG + 0.1% PDMS + 0.5% AA | 10.00 | 0.3472 | |
| 23.3% Sodium Chloride Liquid | 20.00 | 0.6251 | 18.94% |
| 33% NaCl + 0.25% XG + 0.1% PDMS + 0.5% AA | 20.00 | 0.7435 | |
| Solid Sodium Chloride | 20.00 | 0.6317 | 17.70% |
| 33% NaCl + 0.25% XG + 0.1% PDMS + 0.5% AA | 20.00 | 0.7435 | |

E. Example Composition Viscosity Results

Viscosity of suspensions is an important consideration for de-icing compositions. A lower viscosity suspension, including a viscosity similar to that of solution with a salt at its solubility limit, may be applied to surfaces using existing de-icing equipment.

Table 4 shows viscosity in centipoise of different suspensions at different temperatures. Addition of aspartic acid shows a consistent reduction in viscosity regardless of the percent NaCl in the formula. This would indicate that a reducing agent such as aspartic acid has an effect on the rheological behavior of the xanthan gum. The decrease in viscosity was not expected with the addition of a corrosion inhibitor, such as aspartic acid. A decrease in viscosity of even as little as 50 cP may have a large advantage when using suspensions in conventional equipment. The suspensions include compositions from Table 1.

TABLE 4

| Temperature (° F.) | 24% NaCl + 0.25% XG + 0.1% PDMS | 24% NaCl + 0.25% XG + 0.1% PDMS + 0.5% AA | 26% NaCl + 0.25% XG + 0.1% PDMS | 26% NaCl + 0.25% XG + 0.1% PDMS + 0.5% AA | 28% NaCl + 0.25% XG + 0.1% PDMS | 28% NaCl + 0.25% XG + 0.1% PDMS + 0.5% AA | 30% NaCl + 0.25% XG + 0.1% PDMS | 30% NaCl + 0.25% XG + 0.1% PDMS + 0.5% AA | 33% NaCl + 0.25% XG + 0.1% PDMS | 33% NaCl + 0.25% XG + 0.1% PDMS + 0.5% AA |
|---|---|---|---|---|---|---|---|---|---|---|
| | | | | | Viscosity (cP) | | | | | |
| 0.00 | 342 | 293 | 348 | 317 | 432 | 412 | 645 | 612 | 875 | 825 |
| 10.00 | 310 | 287 | 323 | 298 | 382 | 370 | 565 | 522 | 788 | 765 |
| 20.00 | 285 | 262 | 303 | 285 | 245 | 332 | 483 | 432 | 643 | 615 |
| 30.00 | 268 | 248 | 287 | 267 | 327 | 300 | 425 | 390 | 603 | 573 |
| 40.00 | 253 | 240 | 273 | 252 | 305 | 272 | 350 | 300 | 390 | 353 |
| 50.00 | 242 | 227 | 255 | 242 | 282 | 250 | 313 | 280 | 350 | 318 |
| 60.00 | 232 | 213 | 247 | 229 | 272 | 233 | 298 | 267 | 333 | 308 |
| 70.00 | 223 | 203 | 235 | 215 | 263 | 220 | 282 | 252 | 323 | 303 |

FIGS. 7, 8, 9, 10, and 11 plot the viscosities at different temperatures for compositions with and without aspartic acid. The y-axis shows the viscosity in centipoise, and the x-axis shows the temperature. FIGS. 7-11 show that aspartic acid lowers the viscosity at all temperatures tested.

F. Example Composition Corrosion Results

A less corrosive de-icing composition is desired to prolong lifetimes of storage equipment, deicing equipment, vehicles, surfaces, and other materials that may come in contact with the de-icing composition. A higher Pacific Northwest Snowfighters (PNS) corrosion score indicates a more corrosive composition. The Pacific Northwest Snowfighters is a group of Pacific Northwest state transportation agencies, and they developed a test method to measure corrosion of mild steel by de-icing chemicals. The test method is based on the National Association of Corrosion Engineers (NACE) Standard TM0169-95, and modified by PNS. The test procedure uses 30 ml of a 3% chemical de-icer solution per square inch of corrosion coupon surface area. The PNS test uses a gravimetric method using cyclic immersion (10 minutes in a test solution followed by 50 minutes exposed to air) of sets of 3 coupons per test solution for 72 hours. This simulates oxidation that automobile metals would experience in snow storms. The method gives the average corrosion rate over a period of time, and the weight loss result in MPY (mils per year) and is translated into a percentage, or percent corrosion rate (PCR) in terms of the test solutions' corrosivity relative to a 3% NaCl salt brine. A 3% NaCl salt brine has a score of 100, and the other test solutions' corrosion rate is correlated to that. To be accepted for use in most municipalities, a corrosion score of 30 or less is required.

Figure 12:
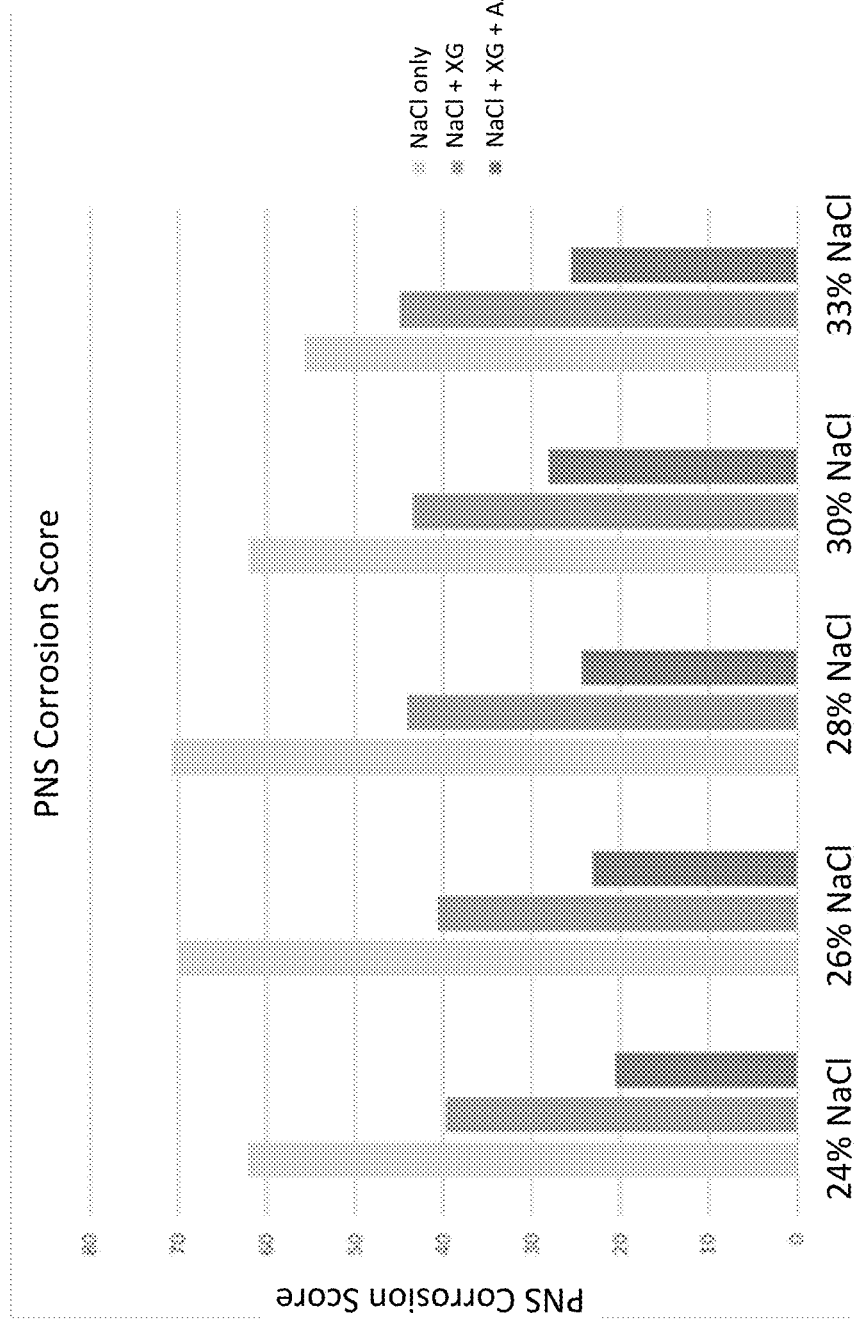
FIG. 12 shows a plot of different compositions and corrosion score according to embodiments of the present invention.

FIG. 12 shows the effect of different components on corrosion score. The PNS corrosion score is plotted on the y-axis. Different concentrations of sodium chloride are plotted on the x-axis. For each concentration of sodium chloride, three different compositions are plotted. The left column for each concentration is a composition with only sodium chloride. The center column for each concentration is a composition with sodium chloride and 0.25% xanthan gum. The right column for each concentration is a composition with 0.25% xanthan gum and 0.50% aspartic acid. FIG. 12 shows that xanthan gum decreases corrosion. The addition of aspartic acid to xanthan gum further decreases corrosion.

G. Example Composition Freezing Point Results

A lower freezing point of the composition is desired so that the composition can be used at lower temperatures. Table 6 shows the effect of aspartic acid on the freezing point. The first column shows the compositions tested. The first composition is a 33% sodium chloride suspension. The second composition is a 33% sodium chloride suspension with the addition of 0.5% aspartic acid. The second column shows the freezing point in degrees Fahrenheit. The third column characterizes the stability of the composition. Table 6 shows that the addition of aspartic acid lowers the freezing point by over 5° F. Both compositions are stable with no sedimentation.

TABLE 5

| Formula | Freezing Point (° F.) | Stability |
|---|---|---|
| 33% NaCl + 0.25% XG + 0.1% PDMS | −0.10 | Stable, no sedimentation |
| 33% NaCl + 0.25% XG + 0.1% PDMS + 0.5% AA | −5.51 | Stable, no sedimentation |

II. Methods of Manufacturing Composition

Figure 13:
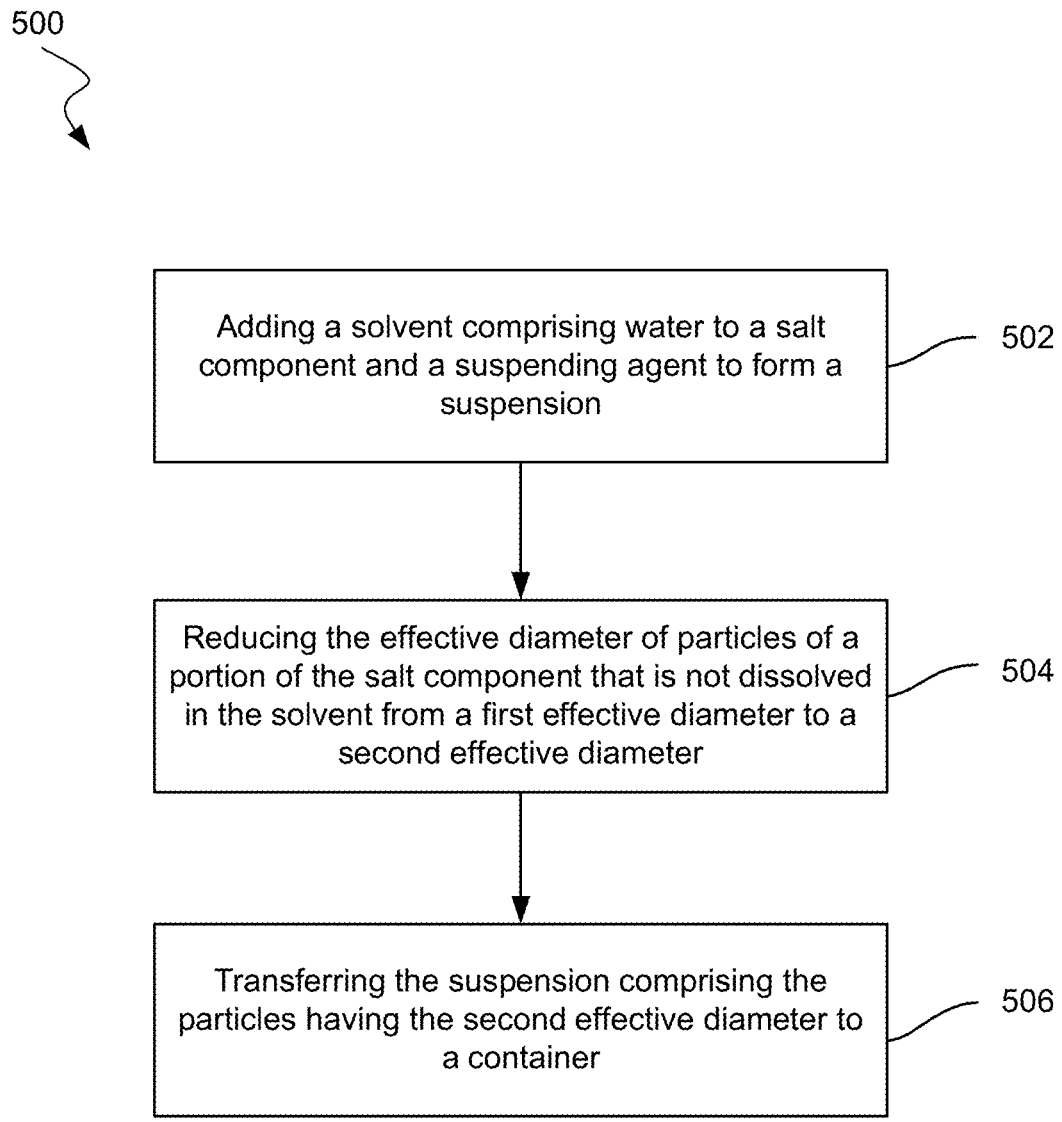
FIG. 13 shows a method of manufacturing a de-icing composition according to embodiments of the present invention.

As shown in FIG. 13, embodiments of the present invention may include a method 500 manufacturing a de-icing composition. Method 500 may include adding a solvent that includes water to a salt component and a suspending agent to form a suspension (block 502). The suspension may include a first portion of the salt component that is not dissolved in the solvent. The salt component and the solvent may be any discussed herein. The first portion of the salt component includes particles with a first effective diameter. The first effective diameter may be the diameter of the salt component in dry form or when in the suspension. The first effective diameter may be under 0.375 inch, including from 0.25 to 0.375 inch, 0.125 to 0.25 inch, or under 0.125 inch.

Method 500 may include reducing the first effective diameter of the particles of the first portion of the salt component from the first effective diameter to a second effective diameter (block 504). The second effective diameter may be less than 100 μm, less than 50 μm, or any effective diameter described herein. Reducing the first effective diameter to the second effective diameter may involve processing the suspension through a shear pump, wet grinding equipment, or any suitable unit operation. Reducing the diameter of particles after contacting the particles with solvent may avoid the need for particulate control. Dry salt particles with diameters of less than 100 μm may become airborne easily and would need to be subject to environmental controls.

Method 500 may also include transferring the suspension with the particles having the second effective diameter to a container (block 506). Transferring the suspension to a container may involve using a pump, including the shear pump. The suspension may include a defoamer. The suspension may include a second portion of the salt component dissolved in the solvent. The second portion of the salt may be dissolved in the solvent upon adding solvent to the salt component in block 502. The second portion of the salt component may be in a concentration equal to the solubility of the salt component in the solvent. In some embodiments, the salt component may include two different types of salt, with one salt dissolved and the other salt not dissolved. A first salt may be dissolved in the solvent until or near the solubility limit to form a solution. A second salt may then be suspended in the solution. The suspension may be any suspension composition described herein.

Method 500 may further include transferring the suspension from the container to a liquid application system on a vehicle. The vehicle may be a truck, including a de-icing truck. The suspension may be transferred from the container to the truck using a pump.

The steps of adding the solvent, reducing the effective diameter, and transferring the suspension may be steps in a continuous process. In a continuous process, the rates of each component need to be maintained to achieve the desired ratio in the final suspension. The rates of each component may be metered by flow controllers or other suitable devices.

In some embodiments, the steps of adding the solvent, reducing the effective diameter, and transferring the suspension may be steps in a batch process. For example, in a batch process, the container may be a production tank. The production tank may hold a batch of the suspension. Because the suspension is produced in batches, the rates of each component do not need to be controlled. Instead, the amount of each component needs to be controlled so that the batch produced for the production tank has the desired concentrations of each component. Method 500 may include transferring the suspension from the production tank to a second container, which may be a day tank. The day tank may be filled when the suspension is needed for de-icing (e.g., in anticipation of or during a snowstorm). Method 500 may further include transferring the suspension from the day tank to a liquid application system on a vehicle. The suspension may be transferred with a pump or any suitable equipment.

Method 500 may further include applying the suspension to ice. The suspension may be applied in any way as described herein. The method may also include melting the ice. The ice may be on any surface described herein.

In some embodiments, the suspension produced is stable for extended periods of time, and end users can keep and store the product in tanks for weeks at a time. This storage is consistent with standard practices in the industry for conventional de-icing compositions. In other embodiments, the de-icing composition may be produced "on-demand." For example, the product may be manufactured from a few minutes to a couple of hours ahead of anticipated use. The suspension may be pumped directly into an application truck or held in a smaller temporary storage tank where product is simultaneously being loaded from and produced into. In this "on-demand production" scenario, the suspension is only required to be stable for a few hours at most. The on-demand model provides flexibility to the customer when managing inventory and controlling costs. In addition, the need for multiple large product storage tanks is negated.

A. Example Continuous Method

Figure 14:
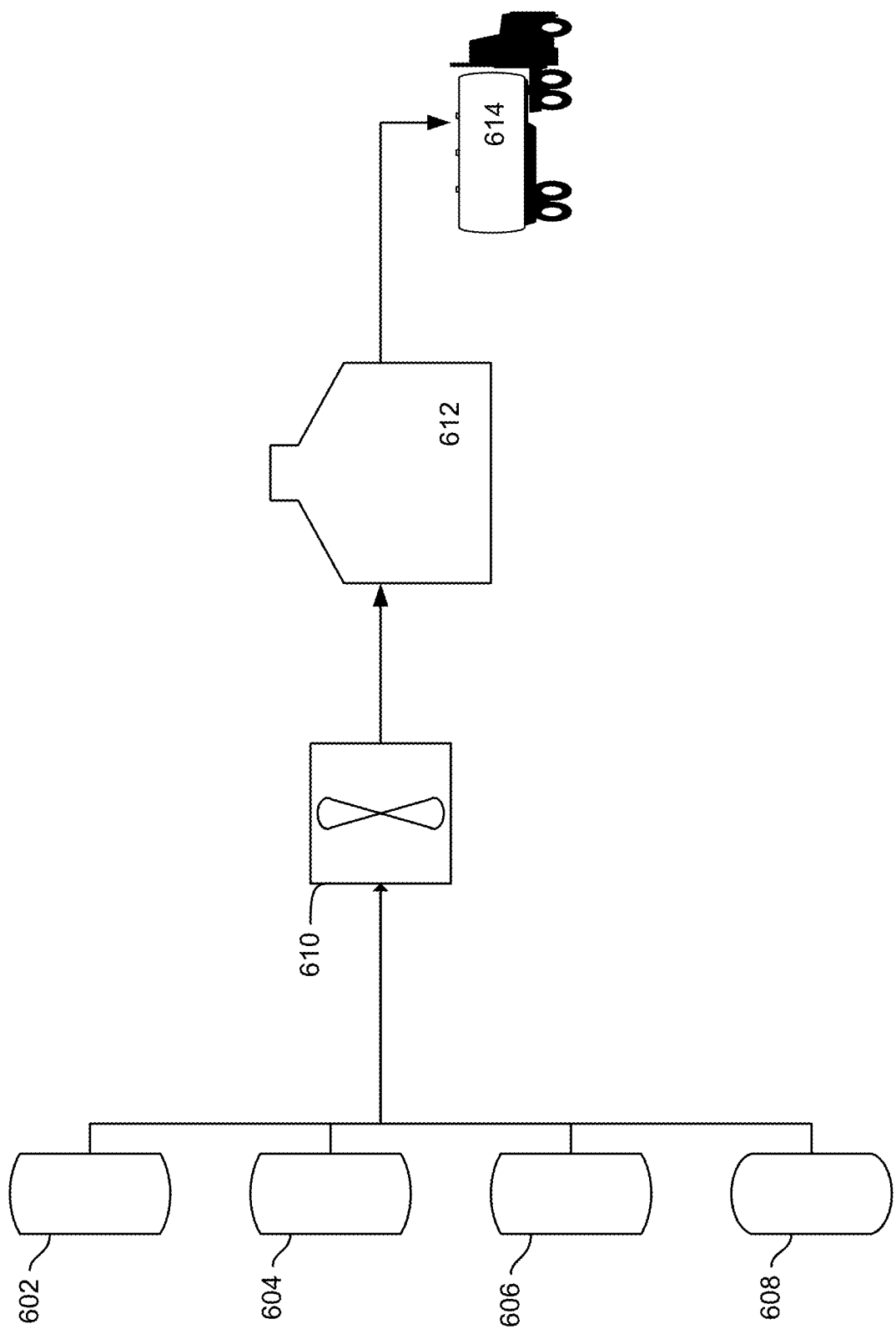
FIG. 14 shows a continuous method of producing a suspension according to embodiments of the present invention.

FIG. 14 shows an example of a continuous method of producing a suspension. Vessels 602, 604, 606, and 608 may hold a component of the suspension. For example, one vessel may hold water, one vessel may hold the salt component, one vessel may hold the suspension agent, and one vessel may hold the defoamer. Although a vessel may hold water, the vessel to store water may not be onsite. Instead, water may be provided from a water source rather than stored in a vessel. By not storing water in a vessel, the process may eliminate equipment and reduce costs. The water source may be municipal water. Additional vessels may be used to hold additional types of salts. In some embodiment, one vessel may hold a plurality of salts. The vessels may be hoppers. The flowrates of each component may be metered to control the final concentration in the suspension. To form a suspension, the salt component must be fed at a rate so that the final concentration of the salt is above the solubility of the salt in water.

The components are mixed together and sent to a shear pump 610. A shear pump is a pump with a rotor that can reduce the size of particles while pumping. Shear pump 610 reduces the size of the undissolved salt particles to any diameter disclosed herein.

The suspension exits shear pump 610 into day tank 612. The suspension includes a portion of the salt component dissolved in water, and a portion of the salt component that is undissolved in water. The undissolved salt component may have particles with an effective diameter of 100 µm or less or any effective diameter described herein. The suspension may be stored in day tank 612 for at least 24 hours, 7 days, or 2 weeks.

The suspension may be transferred from day tank 612 to a de-icing truck 614. The transfer may be at a rate of 300 to 500 gallons per minute. This transfer rate may limit the production of the suspension, as the other steps are faster than 300 to 500 gallons per minute. De-icing truck 614 may include a liquid application system, which enables the application of the de-icing composition to ice. The liquid application system may be a system that is typically used for applying salt solutions for de-icing. The liquid application system may not be altered for the application of a suspension. The smaller particle size may allow the suspension to be applied by a liquid application system.

The continuous process may allow for speedy, on-demand production of a de-icing suspension with little human resource demand.

B. Example Batch Method

Figure 15:
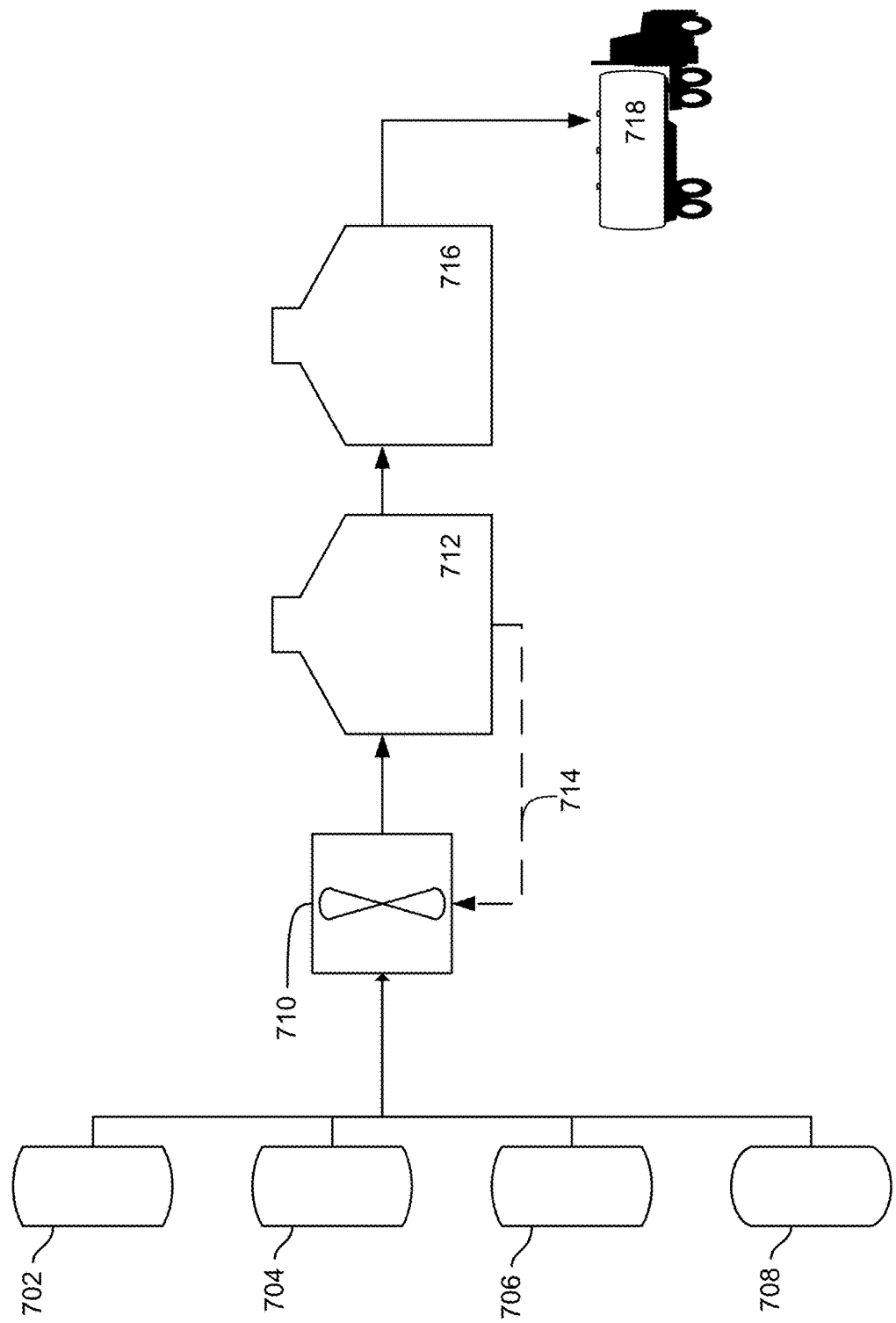
FIG. 15 shows a batch method of producing a suspension according to embodiments of the present invention.

FIG. 15 shows an example of a batch process of producing a suspension. Vessels 702, 704, 706, and 708 may hold a component of the suspension. For example, one vessel may hold water, one vessel may hold the salt component, one vessel may hold the suspension agent, and one vessel may hold the defoamer. As mentioned with FIG. 14, water may be provided from a water source rather than stored in a vessel. Additional vessels may be used to hold additional types of salts. In some embodiment, one vessel may hold a plurality of salts. With a batch process, the amounts of material used should be accurately measured so that the desired concentrations in the final suspension can be achieved.

The components are mixed and sent to a shear pump 710. Shear pump 710 may be similar to and perform the same function as shear pump 610. The undissolved salt particles may be reduced in diameter.

The suspension may exit shear pump 710 to production tank 712. Production tank 712 may hold the suspension. Production tank 712 may hold the suspension for a month. A portion of the suspension may be sent to shear pump 710 (as indicated by stream 714) to help dissolve salt to its solubility limit.

The suspension may be transferred from production tank 712 to day tank 716. Day tank 716 may be similar to and perform the same function as day tank 612. Day tank 716 may hold the suspension for a day or less. The suspension may be transferred to de-icing truck 718, which may be similar to and perform the same function as de-icing truck 614.

The batch process may be a less complex process than a continuous because constant metering of flowrates is not needed. The concentrations in the final suspension can be achieved through setting the starting amounts of the components. The batch process may be performed by a municipality or other user of de-icing compositions without the need to buy or operate equipment to control flowrates.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the component" includes reference to one or more components and equivalents thereof known to those skilled in the art, and so forth. The invention has now been described in detail for the purposes of clarity and understanding. However, it will be appreciated that certain changes and modifications may be practice within the scope of the appended claims.

All publications, patents, and patent applications cited herein are hereby incorporated by reference in their entirety for all purposes. None is admitted to be prior art.

What is claimed is:

1. A de-icing composition, the de-icing composition being a suspension, the de-icing composition comprising:
    a solvent comprising water;
    a salt component in a total concentration greater than the solubility of the salt component in water at a temperature in a range from 0° F. to 40° F., wherein:
        a first portion of the salt component is not dissolved in the solvent, and
        the first portion of the salt component comprises particles with an effective diameter less than 500 µm; and
    a suspending agent.

2. The de-icing composition of claim 1, wherein:
a second portion of the salt component is dissolved in the solvent, and
the second portion of the salt component is in a concentration equal to the solubility of the salt component in the solvent at the temperature.

3. The de-icing composition of claim 1, wherein:
the effective diameter is less than 100 μm.

4. The de-icing composition of claim 1, wherein:
the effective diameter is less than 50 μm.

5. The de-icing composition of claim 1, wherein:
the total concentration is in a range from 35% to 50%.

6. The de-icing composition of claim 1, wherein the suspending agent is in a concentration in a range from 0.01% to 5%.

7. The de-icing composition of claim 1, wherein the salt component is selected from the group consisting of sodium chloride, sodium formate, sodium succinate, sodium acetate, calcium chloride, potassium chloride, potassium acetate, potassium formate, potassium succinate, magnesium chloride, calcium magnesium acetate, sodium citrate, disodium citrate, potassium citrate, potassium magnesium citrate, a salt of EDTA, potassium carbonate, and sodium carbonate.

8. The de-icing composition of claim 1, wherein the suspending agent is selected from the group consisting of an alginate, acacia, tragacanth, xanthan gum, bentonite, carbomer, carrageenan, powdered cellulose, gelatin, gum Arabic, agar, guar gum, locust bean gum, tara gum, gellan gum, inulin, and konjac.

9. The de-icing composition of claim 1, further comprising a dispersant.

10. The de-icing composition of claim 1, wherein the salt component comprises a first salt and a second salt.

11. The de-icing composition of claim 10, wherein:
the first portion of the salt component comprises the first salt,
a second portion of the salt component is dissolved in the solvent,
the second portion of the salt component is in a concentration equal to the solubility of the salt component in the solvent at 0° F., and
the second portion of the salt component comprises the second salt.

12. The de-icing composition of claim 1, further comprising a defoamer.

13. The de-icing composition of claim 1, further comprising a reducing agent.

14. The de-icing composition of claim 1, wherein the de-icing composition comprises a liquid portion that is at least 50% of the de-icing composition.

15. A method for de-icing, the method comprising:
applying the de-icing composition of claim 1 to ice.

16. The method of claim 15, wherein:
applying the de-icing composition comprises using a liquid spray applicator.

17. The method of claim 16, wherein the liquid spray applicator is on a vehicle.

18. The method of claim 15, wherein the ice is on a road, parking lot, or driveway.

19. The method of claim 15, further comprising melting the ice.

20. A method of manufacturing a de-icing composition, the method comprising:
adding a solvent comprising water to a salt component and a suspending agent to form a suspension, wherein:
the suspension comprises a first portion of the salt component that is not dissolved in the solvent, and
the first portion of the salt component comprises particles with a first effective diameter;
reducing the first effective diameter of the particles of the first portion of the salt component from the first effective diameter to a second effective diameter; and
transferring the suspension comprising the particles having the second effective diameter to a container,
wherein the second effective diameter is less than 500 μm.

21. The method of claim 20, further comprising transferring the suspension from the container to a liquid application system on a vehicle.

22. The method of claim 20, wherein the suspension comprises a defoamer.

23. The method of claim 20, wherein reducing the first effective diameter of the particles of the first portion of the salt component comprises using a shear pump.

24. The method of claim 20, wherein adding the solvent, reducing the first effective diameter, and transferring the suspension are steps in a continuous process.

25. The method of claim 20, wherein adding the solvent, reducing the first effective diameter, and transferring the suspension are steps in a batch process.

26. The method of claim 25, wherein:
the container is a first container, the method further comprising:
transferring the suspension from the first container to a second container, and
transferring the suspension from the second container to a liquid application system on a vehicle.

27. The method of claim 20, further comprising:
applying the suspension to ice.

28. The method of claim 20, wherein:
a second portion of the salt component is dissolved in the solvent, and
the second portion of the salt component is in a concentration equal to the solubility of the salt component in the solvent at a temperature in a range from 0° F. to 40° F.

* * * * *